(12) United States Patent  
Hamawaki et al.

(10) Patent No.: US 7,993,804 B2  
(45) Date of Patent: *Aug. 9, 2011

(54) COLOR FILTER STRUCTURE AND DISPLAY DEVICE USING THE COLOR FILTER, AND MANUFACTURING METHOD THEREOF

(75) Inventors: Yoshihiko Hamawaki, Kobe (JP); Yashihisa Hatta, Kobe (JP); Yasuhiro Matsushita, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 1375 days.

This patent is subject to a terminal disclaimer.

(21) Appl. No.: 11/498,189

(22) Filed: Aug. 3, 2006

(65) Prior Publication Data

US 2007/0031742 A1    Feb. 8, 2007

(30) Foreign Application Priority Data

Aug. 5, 2005  (JP) ................................. 2005-227724

(51) Int. Cl.
  *G02B 5/20* (2006.01)
  *G02F 1/1335* (2006.01)
(52) U.S. Cl. ............ 430/7; 347/106; 347/107; 349/113; 349/114
(58) Field of Classification Search .......................... None
  See application file for complete search history.

(56) References Cited

U.S. PATENT DOCUMENTS

| 2002/0060757 | A1 | 5/2002 | Kiguchi et al. | |
| 2003/0063239 | A1 | 4/2003 | Suzuki | |
| 2004/0075793 | A1 | 4/2004 | Itoh et al. | |
| 2004/0109108 | A1* | 6/2004 | Lee et al. | 349/106 |
| 2004/0224599 | A1 | 11/2004 | Sakurada | |
| 2008/0030658 | A1* | 2/2008 | Matsuhita | 349/106 |

FOREIGN PATENT DOCUMENTS

WO  WO 2006/008708 A1 *  1/2006

* cited by examiner

*Primary Examiner* — John A. McPherson  
(74) *Attorney, Agent, or Firm* — Birch, Stewart, Kolasch & Birch, LLP

(57) ABSTRACT

A color filter being precisely and easily manufactured while solving an alignment problem is provided. Further, a method for manufacturing a color filter structure formed in a display panel that has front and rear substrates opposed to each other is provided. This method is provided with: a first step of forming a composite layer (11, 12, 1G, 1C, 1S, 1D) that includes a pixel drive element in a rear substrate 10; a second step of patterning a first rib 42 along a boundary of a pixel region on or above the composite layer and a second rib 44 arranged in the pixel area, the second rib having a height that is smaller than that of the first rib 42 in accordance with a photolithography technique; a third step of dropping a light transmission material in a reflection region Pr defined by the first rib 42 and the second rib 44 and forming a stepped layer 7 in accordance with an ink jet technique; and a fourth step of, after the stepped layer 7 has been formed, dropping a light coloring material 9 in a region defined by the first rib 42 and forming a color layer in accordance with an ink jet technique.

12 Claims, 14 Drawing Sheets

COLOR FILTER STRUCTURE AND DISPLAY DEVICE USING THE COLOR FILTER, AND MANUFACTURING METHOD THEREOF

This application claims the benefit of Japan Application Ser. No. 2005-227724, filed Aug. 5, 2005.

BACKGROUND OF THE INVENTION

1. Field of the Invention

The present invention relates to a display device using a color filter structure and a manufacturing method of such display device. In particular, the present invention relates to a color filter structure suitable for a transflective type liquid crystal display device equipped with a transmission region and a reflection region on a pixel-by-pixel basis or by a predetermined unit display region, as well as to a manufacturing method of such a color filter structure.

2. Description of the Related Art

Conventionally, a color filter has been well known that handles: first light for forming a unidirectional optical path, such that incident light from one main face side of the color filter is transmitted through the filter only once to be colored and guided to the other main face side; and second light for forming a bi-directional optical path such that incident light from the other main face side of the color filter is transmitted through the filter to be colored, and the transmitted light is reflected by means of a light reflection element or the like arranged on the one main face side, and, again, incidents to the filter and is transmitted through the filter to be colored, and then, is returned to the other main face side. This color filter is used for a so-called transflective type liquid crystal display device in which, while light modulation according to an image to be displayed on external light incident from a front side is applied, this modulation is reflected to be guided to the front side, and, while light modulation according to an image to be displayed is applied similarly to incident light caused by a backlight system from a backside, this modulation is transmitted to be guided to the same front side. The liquid crystal display of this type provides effective image display mainly by external light (ambient light) when a use environment is bright (reflection mode), and mainly by spontaneous light emission of a backlight system when the environment is dark (transmission mode).

Such a transflective type liquid crystal display device is disclosed in M. Kudo, et al., "Development of Advanced TFT with Good Legibility under Any Intensity of Ambient Light", IDW' 99, Proceedings of The Sixth International Display Workshops, ADM3-4, pages 182-186, Dec. 1, 1999, sponsored by ITE and SID. In this device, each pixel electrode is divided into a reflection region and a transmission region. The reflection region is provided as an aluminum based reflection electrode portion coated on an acrylic resin having an irregular surface, and the transmission region is provided as an ITO (Indium tin oxide) based transparent electrode portion having a flat surface. In addition, the transmission region is arranged at a center in one rectangular pixel region and exhibits a substantially similar rectangular shape in the pixel region, whereas the reflection region is provided as a portion in the pixel area other than this rectangular transmission region and exhibits a shape such that it surrounds the transmission region. With such pixel configuration or the like, it is intended to improve the visibility.

However, in this known liquid crystal display device, the color purity of a display color varies between the transmission region and the reflection region even in the same pixel. This difference is caused by the fact that light from a backlight system and external light respectively having different optical paths from each other are colored in the same manner, and this causes quality degradation of display colors in a whole screen area.

Patent applications of inventions intending to solve such a disadvantage include Japanese Patent Application Laid-Open No. 2003-84122 (see especially FIG. 3, Claims, and paragraphs 0009, 0010, and 0030 to 0039) that has been filed by the Applicant of the present application. The color filter according to the above invention is directed to a color filter for coloring first light that exhibits a unidirectional optical path and second light that exhibits a bi-directional optical path for each pixel, the color filter having a first color portion for coloring the first light and a second color portion for coloring the second light and wherein the first color portion and the second color portion are different from each other in thickness. Further, the color filter for coloring first light that exhibits a unidirectional optical path and second light that exhibits a bi-directional optical path on for each pixel, has: a stepped layer that can be supported by a substrate, the stepped layer being made of a light transmission material patterned so that a bottom face formed in a predetermined shape corresponding to a region for transmitting the first light in one pixel and at least one recessed portion having a wall face of a predetermined height is formed; and a color layer for coloring the first light and second light, the color layer being deposited on the stepped layer and the recessed portion.

According to the above conventional color filter, the first color portion or a portion of a color layer in a region of the bottom can be thicker than a portion (second color portion) of a color layer in another region, and thus, exhibits a unidirectional optical path. Therefore, a comparatively large coloring effect is applied to first light subjected to coloring action only once, whereas a bi-directional optical path is exhibited. Therefore, a comparatively small coloring effect can be applied to second light subjected to coloring action twice. In this manner, at color purity made uniform in pixels in response to the first light and the second light, the associated color can be reproduced, thereby improving quality of color display in a whole screen area.

In the above described conventional art, while a structure for obtaining a color balance in a pixel is primarily proposed, there is no specific disclosure of how to efficiently manufacture a color filter having such a structure. Additionally, in spite of the fact that the manufacturing steps has become complicated by complicating a pixel structure in order to enable the color balancing, consideration for simplifying a manufacturing process from aspects such as actual cost and yields or the like is not given at all.

On the other hand, it is primary routine that a process in accordance with a photography technique is conventionally carried out for patterning of a black matrix in a color filter and color portions of red (R), green (G), and blue (B). This is because such black matrix and color portions must be formed in a very fine shape, and in particular, the shapes of color filters for use in display panels employed for portable devices such as portable cellular phones require very high precision. However, the manufacturing in accordance with the lithography technique requires a number of steps and photo masks, and is disadvantageous in simplification of the whole manufacturing process.

The inside of pixels is subdivided into the first color portion and the second color portion. Thus, there is a need for alignment between the first and second color portions and the above transparent electrode portion and reflection electrode portion as well as alignment between a color filter pixel region and a pixel electrode region. A pasting step between one substrate that carries the color filter and the other substrate that carries the pixel electrode must be strict and precise. This increases a burden in development and manufacturing.

SUMMARY OF THE INVENTION

The present invention has been made in view of the above-described circumstance. It is an object of the present invention to provide a structure and a display device, and a manufacturing method thereof capable of easily manufacturing a color filter structure equivalent to the structure described in each of the above documents.

It is another object of the present invention to manufacture a color filter structure with fewer steps, higher yields, and less cost, which is suitable for a transflective type liquid crystal display device that includes a transmission region and a reflection region for each pixel or by a predetermined unit display region.

Further, it is still another object of the present invention to provide a liquid crystal display device and a manufacturing method thereof capable of solving a problem associated with alignment and mitigating a development and manufacturing burden.

In order to achieve the above described objects, according to a first aspect of the present invention, there is provided a method for manufacturing a color filter structure formed in a display panel that has a front substrate and a rear substrate facing each other, the method including: a first step of forming a composite layer that includes a pixel drive element in the rear substrate; a second step of patterning a first rib along a boundary of a pixel region on or above the composite layer and a second rib arranged in the pixel area in accordance with a photolithography technique, the second rib having a height that is smaller than that of the first; a third step of dropping a light transmission material in a reflection region defined by the first rib and the second rib and forming a stepped layer in accordance with an ink jet technique; and a fourth step of, after the stepped layer has been formed, dropping a light coloring material in a region defined by the first rib and forming a color layer in accordance with an ink jet technique. In addition, according to a second aspect of the present invention corresponding thereto, there is provided a color filter structure formed in a display panel that has front and rear substrates opposed to each other, the color filter structure including: a composite layer that includes a pixel drive element formed on the rear substrate; a first rib formed along a boundary of a pixel region on or above the composite layer; a second rib arranged and formed in the pixel region, the second rib having a height that is smaller than that of the first rib on or above the composite layer; a stepped layer formed by dropping a light transmission material in a reflection region defined by the first rib and the second rib in accordance with an ink jet technique; and a color layer formed by dropping a light coloring material in a region defined by the first rib in accordance with an ink jet technique.

By doing this, the stepped layer and the color layer are formed in accordance with an ink jet technique, so that a whole manufacturing process is simplified. Moreover, by first and second ribs formed in advance, a dropping material using an ink jet is dammed from outflow to the outside of the ribs. Thus, although there is no need for so high precision for an ink jet dropping operation, the stepped layer and color layer can be precisely patterned in desired shapes. In addition, a color filter structure is formed in a shape such that it is incorporated in the composite layer in a rear substrate. One color portion is directly formed in a reflection region, and the other color portion unavoidably occupies a region other than the reflection region without any deviation. Thus, the alignment problem as described above does not occur.

In these first and second aspects, it is desirable that a reflection portion having a height that is smaller than that of the second rib be formed in the reflection region. In this manner, it is guaranteed that a stepped layer is directly formed on the reflection region.

In addition, at least a part of a base portion defining a surface shape of the reflection portion is formed simultaneously or integrally with the first rib and/or the second rib, whereby simplification of the manufacturing steps is promoted more significantly.

Further, a light transmission conductive layer that extends over a surface of the color layer may be further provided. The reflection portion may have a light reflection conductive film that extends over a main face thereof and extends up to a top face of the first rib. This light reflection conductive film may be connected to the light transmission conductive layer in the top face. In this manner, it becomes possible to flatly form an electrode (light transmission conductive film) for practically applying an electric filed to a side opposed to a rear substrate onto a color layer without affecting a reflection mode. In addition, the electrode can be connected to the light transmission conductive film via a lower composite layer portion and the light reflection conductive film.

In addition, the first rib may serve as a photo spacer for forming a predetermined gap between the front substrate and the rear substrate. By doing this, a photo spacer manufacturing process can be taken in a manufacturing process of a color filter structure, thus making it possible to achieve simplification of the whole manufacturing steps of the rear substrate. In this case, there can be provided an invention further including a light transmission conductive layer that extends over a surface of the color layer, wherein the first rib has a photo spacer portion for forming a predetermined gap between the front substrate and the rear substrate and an intermediate portion having a height that is lower than that of the photo spacer portion; wherein the reflection portion has a light reflection conductive film that extends over a main face thereof and extends up to a top face of the first rib; and wherein the conductive layer is connected to the light transmission conductive layer in the top face.

In addition, in order to achieve the above described objects, according to a third aspect of the present invention, there is provided a method for manufacturing a color filter structure formed in a display panel that has a front substrate and a rear substrate facing each other, the method including: a first step of forming a composite layer that includes a pixel drive element in the rear substrate; a second step of patterning a rib along a boundary of a pixel region on or above the composite layer in accordance with a photolithography technique; a third step of patterning a stepped layer in a reflection region in the pixel region in accordance with an photolithography technique wherein the stepped layer has a height that is smaller than that of the rib in the pixel region; and a fourth step of dropping a light coloring material in a region defined by the rib and forming a color layer in a region defined by the rib in accordance with an ink jet technique. In addition, according to a fourth aspect of the present invention corresponding thereto, there is provided a color filter structure formed in a display panel that has front and rear substrates opposed to each other, the color filter structure including: a composite layer that includes a pixel drive element formed on the rear substrate; a rib formed along a boundary of a pixel region on or above the composite layer; a stepped layer formed on or above the composite layer having a height wherein the stepped layer has a height that is smaller than that of the rib in a reflection region in the pixel region; and a color layer formed by dropping a light coloring material in a region defined by the rib in accordance with an ink jet technique.

By doing this, although the stepped layer is not formed in accordance with the ink jet technique, the second rib in each of the above-described aspects is eliminated. The color layer is formed in accordance with the ink jet technique, so that the whole manufacturing process is simplified. In this case as well, by the presence of the rib, the dropping material is dammed from outflow to the outside of the rib, and thus, there is no need for so high precision in a dropping operation. In addition, similarly, the color filter structure is formed in a shape such that it is incorporated in the composite layer in a rear substrate, and thus, no alignment problem occurs. Advantageous effect specific to these aspects is that the reflection region or transmission region can be widely taken and an aperture rate is improved because the second rib is not formed.

In these third and fourth aspects as well, at least a part of abase portion defining a surface shape of the reflection portion can be formed simultaneously or integrally with the rib. At least a part of a base portion defining a surface shape of the reflection portion can be formed simultaneously or integrally with the rib. A light transmission conductive layer that extends over a surface of the color layer can be further provided; the reflection portion can have a light reflection conductive film that extends over a main face thereof and extends up to a top face of the rib; and the light reflection conductive film can be connected to the light transmission conductive layer in the top face. Advantages relevant to these aspects are similar to those described above.

Further, in order to achieve the above described objects, according to a fifth aspect of the present invention, there is provided a method for manufacturing a color filter structure formed in a display panel that has a front substrate and a rear substrate facing each other, the method including: a first step of forming a composite layer that includes a pixel drive element in the rear substrate; a second step of forming a first rib along a boundary of a pixel region on or above the composite layer and a second rib arranged in the pixel region, the second rib having a height that is equal to that of the first rib, in accordance with a photolithography technique; and a third step of dropping a light coloring material in a reflection region defined by the first rib and the second rib and forming a first color portion, and then, dropping a light coloring material in a transmission region defined by the first rib and the second rib and forming a second color layer, in accordance with an ink jet technique. In addition, according to a sixth aspect of the present invention corresponding thereto, there is provided a color filter structure formed in a display panel that has front and rear substrates opposed to each other, the color filter structure including: a composite layer that includes a pixel drive element formed on the rear substrate; a first rib formed along a boundary of a pixel region on or above the composite layer; a second rib arranged and formed in the pixel region, the second rib having a height that is equal to that of the first rib on or above the composite layer; a first color portion formed by dropping a light coloring material in a reflection region defined by the first rib and the second rib in accordance with an ink jet technique; and a second color portion formed by dropping a light coloring material in a transmission region defined by the first rib and the second rib in accordance with an ink jet technique.

By doing this, the stepped layer is eliminated, and the individual color portion of a respective one of the reflection region and the transmission region is formed in accordance with the ink jet technique, so that the whole manufacturing process is simplified. In this case as well, by the presence of the rib, the dropping material is dammed from outflow to the outside of the rib, and thus, there is no need for so high precision in a dropping operation. In addition, similarly, the color filter structure is formed in a shape such that it is incorporated in the composite layer in the rear substrate, and thus, no alignment problem occurs. Advantageous effects specific to these aspects are that a comparatively simple structure can be employed because the stepped layer is not formed and that the second rib is formed at the same height as that of the first rib, thus making it possible to simplify a configuration of a photo mask for forming these ribs.

In these fifth and sixth aspects, it is desirable that the first and second color portion be defined in their respective thickness and/or material so as to exhibit a coloring effect that the first color portion is lower than the second color portion. In this manner, it becomes possible to reduce a difference in coloring effect of light handled in a respective one of the reflection region and the transparent region, and then, achieve uniform color reproducibility in pixels. In addition, it is preferable that the first color portion should have a surface that is higher than that of the second color portion. In this manner, it becomes possible to reduce a cell gap in the reflection region more significantly than that in the transmission region. In addition, it becomes possible to reduce an optical path difference between the reflection light and the transmission light in the display panel. That is, the reflection region has a forward path for the light incident from the outside of the front substrate to arrival at the reflection layer and a backward path for light reflection from the reflection layer to exit to the outside of the front substrate. Logically, the reflection region exhibits an optical path that is as twice in length as the transmission light in the transmission region. Thus, the cell gap in the reflection region is reduced, thereby making it possible to reduce the lengths of the forward path and the backward path so as to equal to a optical path for transmission light.

In addition, in these fifth and sixth aspects as well, a reflection portion formed in a lower layer of the first color portion in the reflection region can be provided. At least a part of a base portion defining a surface shape of the reflection portion can be formed simultaneously or integrally with the first rib and/or the second rib. A light transmission conductive layer that extends over a surface of the color layer can be further provided; the reflection portion can have a light reflection conductive film that extends over a main face thereof and extends up to a top face of the rib, and the light reflection conductive film can be connected to the light transmission conductive layer in the top face. Advantages relating to these aspects are attained as described above.

In each of the above-described aspects, it is convenient if the rib is formed of a light interruption material, because the rib functions as a so-called black matrix. In particular, in the case where a second rib is formed, there is attained an advantage that the second rib can hide the behavior of unnecessary light can be hidden, the unnecessary light having a possibility of occurring at a junction portion between the reflection region and the transmission region. In addition, if the base portion has an irregular surface for exhibiting light scattering property, there is no need for additionally providing a light scattering layer. Moreover, such no need is convenient because scattering can be applied only to reflection light.

According to a preferred aspect of the manufacturing method, as in the first aspect, each region defined by the first rib and the second rib in which the light transmission material is dropped is disposed linearly in a main face of the composite layer to form a plurality of line regions, and, in the third step, at least one ink jet head, an ejection portion of which is opposed to the line region and is moved along a longitudinal extending direction of the line region, carries out dropping of the light transmission material for each of the line regions. In addition, as in the first and third aspects, each region defined by the rib in which the light coloring material is dropped is disposed linearly in a main face of the composite layer to form a plurality of line regions, and, in the fourth step, at least one ink jet head, an ejection portion of which is opposed to the line region and is moved along a longitudinal extending direction of the line region, carried out dropping of the light coloring material for each of the line regions. Further, as in the fifth aspect, in the third step, the each reflection region is disposed linearly in a main face of the substrate to form a plurality of line regions; at least one ink jet head, an ejection portion of which is opposed to the line region and is moved along a longitudinal extending direction of the line region, carries out dropping of a light coloring material for the first color portion for each of the line regions, and/or the each transmission region is disposed linearly in a main face of the substrate to form a plurality of line regions, and at least one ink jet head, an ejection portion of which is opposed to the line region and is moved along a longitudinal extending direction of the line region, carries out dropping of a light coloring material for the second color portion for each of the line regions. These aspects are featured in that the dropping regions are linearly arranged, and displacement of an ink jet head is carried out by means of simple control, thereby leading to improved effectiveness of the manufacturing steps.

A still another aspect of the present invention is directed to a display device using a color filter structure derived from each of the above described aspects, wherein the color filter structure is eliminated from the front substrate, and the reflection region modulates light incident into the display panel from an outside of the front substrate in a reflection mode for each pixel, and a region other than the reflection region in a pixel region modulates light incident into the display panel from an outside of the rear substrate in a transmission mode, thereby forming a color display image. In this manner, a display device having the above described various advantages is provided. In particular, this aspect is suitable to a transflective type liquid crystal display device.

DETAILED DESCRIPTION OF THE PREFERRED EMBODIMENT

Herein after, the foregoing and other aspects of the present invention will be described by way of embodiments with reference to the accompanying drawings.

FIG. 1 to FIG. 8 show schematic cross sections, each showing a color filter structure in each process of a manufacturing method according to one embodiment of the present invention.

First Embodiment

Figure 1:
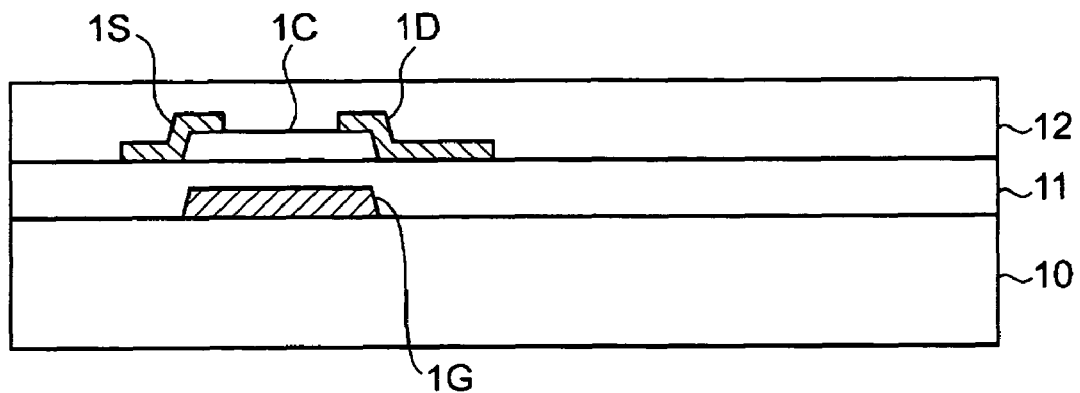
FIG. 1 is a sectional view schematically depicting a color filter structure in a first process of a color filter manufacturing method according to one embodiment of the present invention.

In FIG. 1, there is shown a structure of a composite layer including a TFT (thin film transistor) that is a pixel drive element of a liquid crystal display device. In order to form this structure, first, a glass substrate 10 serving as a substrate is prepared. After required treatment such as washing has been carried out, a metal material such as aluminum is deposited on the substrate, and is patterned to form a gate electrode 1G of the TFT and a gate bus line (not shown) connected thereto. The gate electrode 1G is formed here on a pixel-by-pixel basis. After these gate-associated portions have been formed, an electrical insulation material such as SiNx is deposited fully on the substrate to form a first insulation layer 11. On the insulation layer 11, amorphous silicon (a-Si) serving as a semiconductor material and phosphor (P)-doped amorphous silicon each are deposited in order and are patterned to form a semiconductor layer 1C. The semiconductor layer 1C is formed in a shape (island shape) that corresponds to the gate electrode 1G. Next, a metal material such as molybdenum is deposited. The thus deposited metal material is patterned so as to come into contact with the semiconductor layer 1C and so as to be opposed to each other in a plan view. Then, a drain electrode 1D and a source electrode 1S, and a source bus line (not shown) connected to the source electrode 1S are formed. Then, the source electrode and the drain electrode are masked, and P-doped a-Si is etched. Then, an electrical insulation material such as SIN is deposited fully on the substrate to form a second insulation layer 12. The glass substrate 10 can be substituted by a transparent or light transmission synthetic resin substrate or the like.

Figure 2:
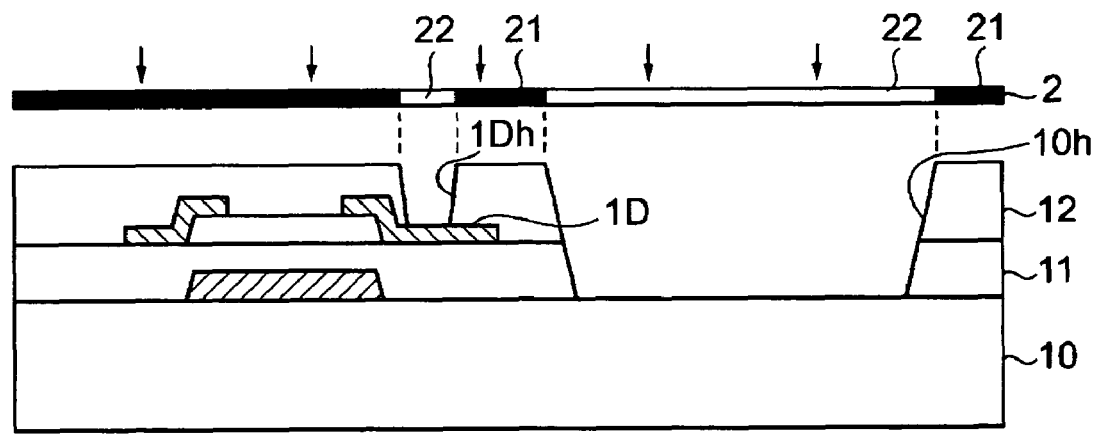
FIG. 2 is a sectional view schematically depicting a color filter structure in a second process of a color filter manufacturing method according to the one embodiment of the present invention.

In FIG. 2, there is shown a fundamental structure of a connection portion of a drain electrode 1D and a portion that serves as one main region (transmission region) of a color filter. In order to form this structure, as a material for first and second insulation layers 11 and 12, there is employed a material of type suitable to a photolithography technique or a coloring material sensing technique, more specifically, an inorganic acrylic based transparent or opaque photosensitive resin. In addition, in a state of FIG. 1, a photo mask 2 is deposited on the substrate over a second insulation layer 12, and then, exposure treatment is carried out. This appearance is shown in FIG. 2. The photo mask 2 is patterned according to two types of portions. One of them is provided as a portion 21 (indicated by black) that substantially completely interrupts light used in the exposure treatment and the other one is provided as a portion 22 (indicated by white (blank) that substantially completely transmits the light. When the insulation layers 11 and 12 are irradiated with light via such a photo mask 2, these materials are photo-sensed in a pattern that corresponds to first and second portions 21 and 22. Next, fixing treatment such as developing treatment and heat treatment is carried out, and then, a region corresponding to the second portion 22 is removed from each of the insulation layers 11 and 12. As a result, a through hole 10Dh for partially exposing the drain electrode 1D and a through hole 10h for partially exposing the substrate 10 are formed as shown in FIG. 2. The through hole 1Dh occupies a region for making connection with the drain electrode 1D later, and the through hole 10h occupies a region for forming a transmission portion in the color filter structure (in general, a region other than that of the through hole 10h is provided as a reflection region).

Figure 3:
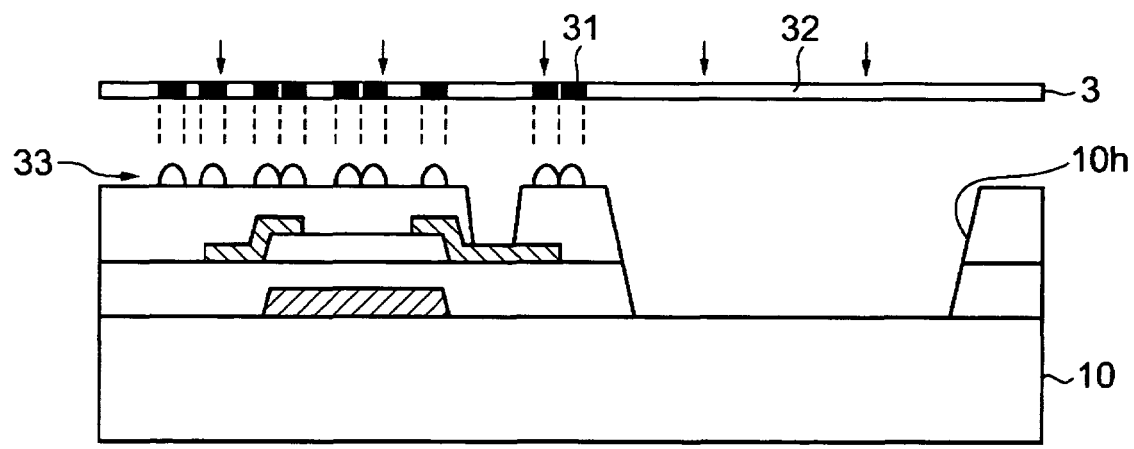
FIG. 3 is a sectional view schematically depicting a color filter structure in a third process of a color filter manufacturing method according to the one embodiment of the present invention.

In FIG. 3, a fundamental structure of a reflection portion is shown. In order to form this structure, a predetermined organic material, more specifically, an acrylic photosensitive resin of type suitable to a photolithography technique or a coloring material sensing technique, is deposited fully on a through hole-formed substrate shown in FIG. 2. Then, as shown in FIG. 3, a photo mask 3 is deposited on the substrate, and then, exposure treatment is carried out. This photo mask 3 is also patterned into two types of portions, an interruption portion 31 and a transmission portion 32, as in the photo mask 2. The thus patterned photo mask is photo-sensed in the corresponding pattern after light irradiation. Then, after developing and fixing treatments, an irregular base layer 33 is formed, the layer having a surface that includes comparatively fine protrusions and recesses as shown in FIG. 3. Here, in general, the base layer 33 is formed in a region other than the through hole 10h, i.e., in a region of a reflection portion in the color filter structure.

Figure 4:
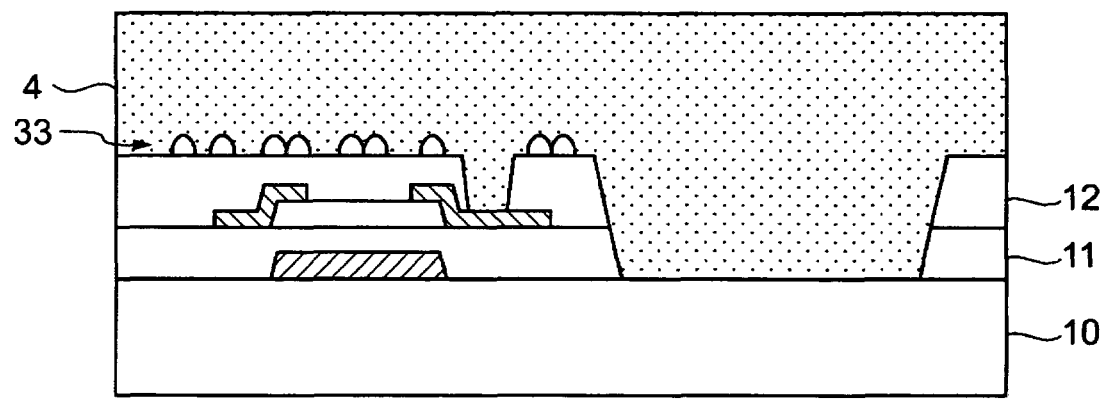
FIG. 4 is a sectional view schematically depicting a color filter structure in a fourth process of a color filter manufacturing method according to the one embodiment of the present invention.

FIG. 4 shows how an electric insulation material 4 has been deposited on a substrate having such a reflection portion fundamental structure. Although this material can be employed as an organic material similar to that used in the base layer 33, a light interruption material is convenient. This is because the material 4 forms a pixel boundary portion and a portion of a boundary between a transmission portion and the reflection portion in its finish state, thus making it possible to function as a black matrix if such a portion is light interruptive. More specifically, as the material 4, a material of type suitable to a photolithography technique or a coloring material sensing technique is selected, and a color sensitive material (color resist) obtained by dispersing a finely grain pigment (black pigment) is used for a photo sensitive resin. More specifically, an acrylic black photo sensitive resin or the like can be employed. The lamination of the material 4 can be carried out in accordance with slit coating or a variety of printing techniques and the like. After such lamination, the substrate is heated for 1 to 3 minutes at 70° C. to 100° C. in accordance with pre-bake treatment, and the material 4 is cured or stabilized.

Figure 5:
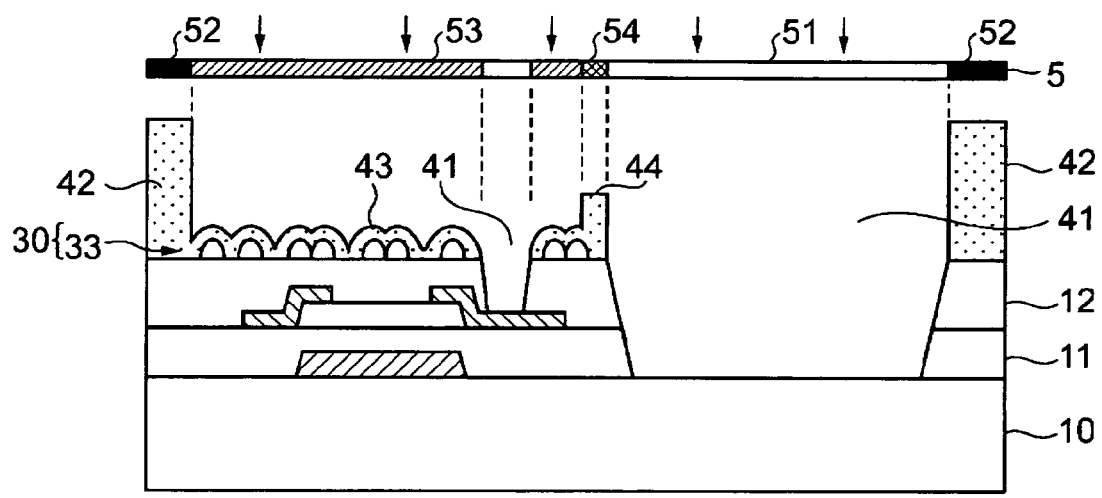
FIG. 5 is a sectional view schematically depicting a color filter structure in a fifth process of a color filter manufacturing method according to the one embodiment of the present invention.

Then, a photo mask 5 is deposited on the substrate over the material 4, and then, exposure treatment is carried out. This appearance is shown in FIG. 5. The photo mask 5 is provided as a so-called half-tone mask, and is patterned into four types of portions here. One of them is provided as a portion 52 that substantially completely interrupts light used in the exposure treatment, and the other one is provided as a portion 51 that substantially completely transmits the light. A third portion 53 is represented by single hatching in the figure, and the light is transmitted at a predetermined intermediate level, with a transmission rate of about 50%. A fourth portion 54 is represented by cross-hatching in the figure, and the light is transmitted at a predetermined intermediate level, with a transmission rate that is lower than that of the third portion 53. In this embodiment, the light is transmitted with a transmission rate ranging from 10% to 30%.

When the material 4 is irradiated with light via such a photo mask 5, the material 4 is photo-sensed in association with these first to fourth portions 51 to 54; a pattern of the photo mask 5 is transferred, and substance property locally changes. Then, through the developing treatment and the fixing treatment, there are formed: a portion 41 corresponding to the first portion 51 of the photo mask 5; a portion 42 corresponding to the second portion 52 thereof; a portion 43 corresponding to the portion 53 thereof; and a portion 44 corresponding to the fourth portion 54 thereof.

The portion 41 is provided as a portion from which an organic material 4 has been substantially completely removed, and exhibits a cavity. The portion 42 is hardly irradiated with light, and maintains a non-dissolved state relevant to the developing solution. Thus, this portion remains at a height that is substantially equal to that of the original material 4. The portion 43 is irradiated with light at an intermediate transmission rate that is comparatively high, and the portion 44 is irradiated with light at an intermediate transmission rate that is comparatively low. Thus, each of these portions has a height that is slightly lower than that of the portion 42 having a maximum height and has a height that is higher than that of the portion 41 having a minimum height, and the portion 43 is slightly lower than the portion 44 in height. Thus, as shown in FIG. 5, a variety of portions are formed, each of which is made of the material 4 and which has a height specific thereto. The portion 42 functions as a first rib along a boundary of a pixel region, and the portion 44 functions as a second rib. In addition, the portion 43 covers a base layer 33 and serves as a top layer portion of a base portion 30 defining a surface shape of a reflection portion 43 thereof. The base portion 30 and it stop layer portion 43 serve to scatter on its irregular surface. For definitions of these irregular patterns, reference can be made to Japanese Patent Application Laid-open No. 2003-172812, for example.

Figure 6:
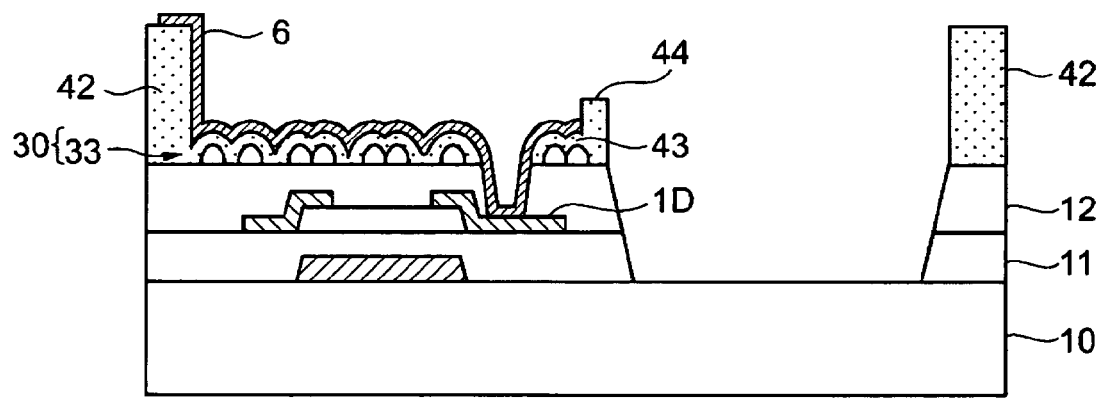
FIG. 6 is a sectional view schematically depicting a color filter structure in a sixth process of a color filter manufacturing method according to the one embodiment of the present invention.
Figure 6A:
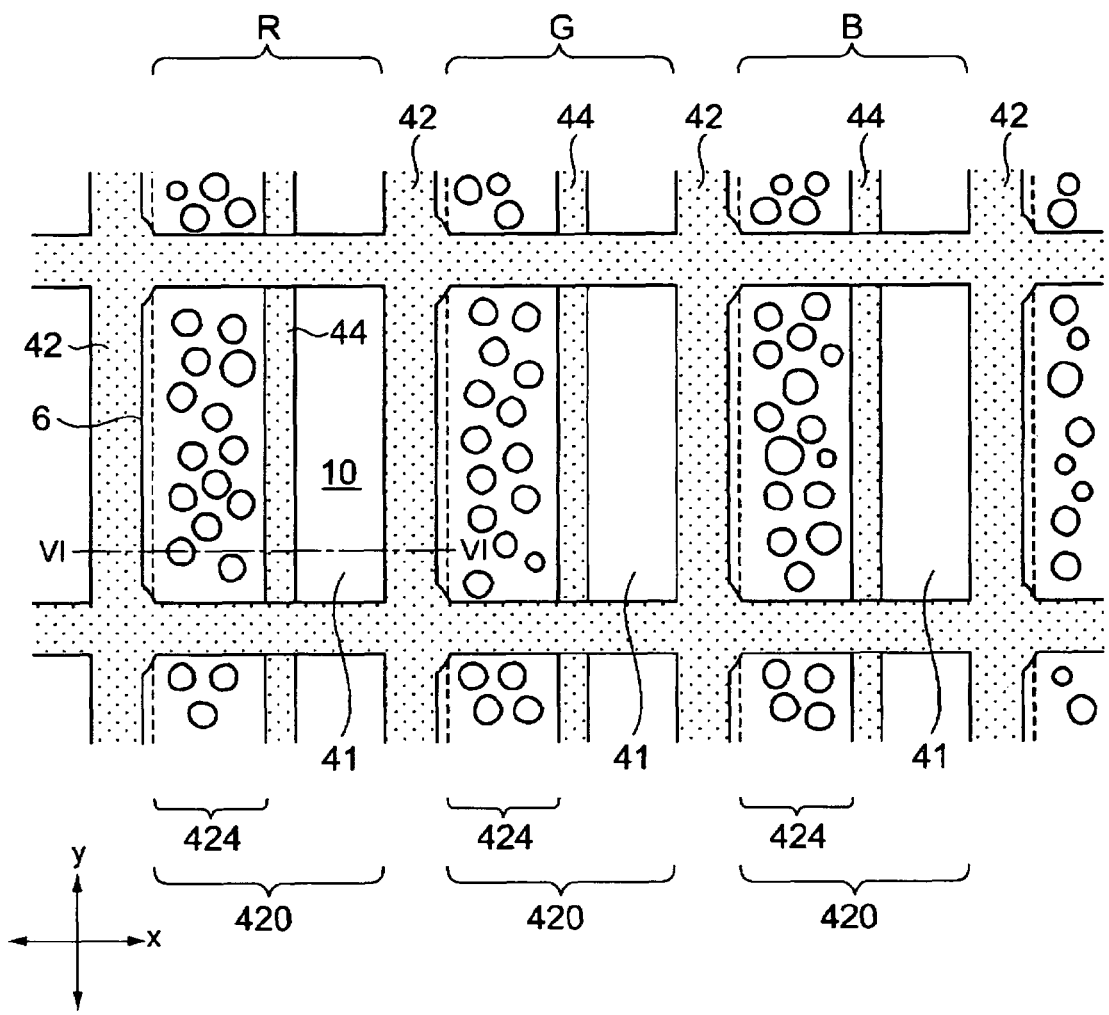
FIG. 6A is a schematic plan view of a color filter structure in the process of FIG. 6.

In FIG. 6, there is shown a structure of a reflection portion in a color filter structure. Because of such a structure, after a light reflection metal (conductive) material such as aluminum has been deposited fully on the substrate including the above top layer portion 43, only the reflection portion is patterned so that the material persists as an afterimage. In this manner, a reflection film 6 is formed, the film having a light scattering surface. This reflection film 6 occupies a reflection region serving as one main region in pixels as in the base layer 33 and the to player portion 43 and makes connection with a drain electrode 1D. A plan view corresponding to FIG. 6 is shown in FIG. 6A.

Here, a first rib 42 preferably forms a black matrix, and a region surrounded by this rib 42 corresponds to a pixel region relevant to a respective one of primary colors of red (R), green (G), and blue (B). As shown in FIG. 6A, the pixel region defined by the rib 42 is formed in a rectangular shape. In the figure, the vertically arranged pixel regions are all used for the primary colors. The second rib 44 is formed in such a pixel region. In the present embodiment, the pixel regions are horizontally divided, and are patterned in a shape such that they pass through their substantial center in a vertical direction.

In this manner, the first and second ribs 42 and 44 are formed together with the top layer portion 43 of the base portion 30 of the reflection portion in accordance with treatment using the photolithography technique. After the reflection film 6 has been formed, processing goes to the next step as referenced in FIG. 7, to carry out treatment of forming a stepped layer and a color layer in accordance with an ink jet technique. This treatment is first carried out by dropping a transparent liquid ink material 7 for forming the stepped layer from an ink jet head (described later) to a reflection region defined by the first rib 42 and the second rib 44. More specifically, an ejection portion of the ink is opposed to a linear longitudinal region formed by a respective one of the regions defined by the ribs 42 and 44, that are vertically arranged, respectively, as shown in FIG. 6A, i.e., by a line region 424 (hereinafter, referred to as local column region). While the head is moved along a longitudinal extending direction y (vertical direction of FIG. 6A), an ink material 7 is ejected. For example, the ink material 7 is continuously dropped to the local column region 424 so as to draw a straight line from the top to the bottom. In the case where such head is used alone, for example, heat movement control is carried out so as to sequentially drop the ink material from a local column region 424 positioned at the left in the substrate main face to a local column region 424 positioned at the right therein on a one by one column region basis. Preferably, when the head is prepared in plurality, and then, a dropping operation is made simultaneously with respect to a plurality of column regions, efficient manufacturing is achieved. In an ink jet technique, this operation is convenient because a multi-head structure can be comparatively easily employed. Finally, the ink material 7 is vertically formed so as to sequentially jump the portion while overlapping a portion of the rib 42 that horizontally extends.

While the ink material 7 is deposited slightly over a rim part of the rib 44, such over-deposition can be ignored to some extent at a stage immediately after dropping. This is because the ink material 7 is contacted by heating treatment or the like in the subsequent step, thus making it possible to finally deforming, i.e., stabilizing the ink material 7 in a predetermined shape of a height that is substantially equal to that of the rib 44 at a substantial majority of part. In addition, the ink material adhered onto a top part of the rib 44 becomes sufficiently thin, and the thickness of the deposited ink can be restrained to an extent such that no problem occurs. The degree of such over-deposition or contraction can be optimized in accordance with a variety of ink material properties and dropping parameters.

As the ink material 7, there can be employed a material that exhibits stable fluidity such that no clogging occurs with a nozzle of an ink jet head. In the present embodiment, a stepped layer is formed in accordance with an ink jet technique, as described above. Thus, there is no need for a material having photosensitivity. In addition, unlike the steps in accordance with a conventional photolithography technique, there is an advantage that a wasteful material for the layer does not occur.

After forming the stepped layer 7, treatment of forming a color layer in accordance with an ink jet technique is carried out. This treatment is carried out by ejecting a light coloring liquid ink material 8 of any one of R, G, and B for forming the color layer from an ink jet head, and then, dropping the ink material in a region defined by the first rib 42. More specifically, while an ejection portion of the ink jet head is opposed to a linear longitudinal region formed by a respective one of the regions defined by the ribs 42 that are vertically arranged, respectively, i.e., to a line region 420 (hereinafter, referred to as comprehensive column region), and then, the head is moved along a longitudinal extending direction y (vertical direction of FIG. 6) of the comprehensive column region, the ink material 8 is ejected. For example, the ink material 8 is continuously dropped onto the column region so as to draw a straight line from the top to the bottom. In the case where such a head is used alone, for example, head movement control is carried out so as to sequentially drop the ink material from a column region 420 positioned at the left in the color filter main face to a column region 420 positioned at the right therein, i.e., to the column region corresponding to the corresponding color (R, G, B) on one by one basis. Finally, the ink material 8 is linearly formed so as to sequentially jump a portion of the rib 42 while overlapping a portion that extends horizontally of the rib 42 and the rib 44, and the stepped layer 7. After dropping the ink material 8, heat treatment for stabilizing the ink material is carried out in the same manner as that for the above ink material 7.

The inkjet treatment and heat treatment of the ink material 8 as described above are carried out while the ink material 8 is used as a material corresponding to the color to be treated, with respect to each of the colors R, G. and B, whereby color layers by the ink material 8 can be fully completed. In response to the structure shown in FIG. 7, a transparent or light transmission protective layer is further formed on the color layer 8, whereby the shown structure may be coated. In this manner, a rigid color filter structure having high reliability can be obtained. However, in the present embodiment, such a protection can be achieved by means of a transparent conductive film described below.

The ink material 8 is also deposited slightly over rim parts of the left and right ribs 42 in practice. However, as is the case with the above ink material 7, the degree of such an over-deposition or contraction of the ink material 8 is optimized, thereby making it possible to form a final desired shape can be formed.

A specific material for the ink material 8 also requires a condition similar to that for the ink material 7. However, unlike the ink material 7, in order to form a color layer, finally, light coloring property must be obtained. Thus, a mixture of pigment or dye particles of the primary colors of R, G, and B, for example, can be employed for the ink material 8. Thus, in particular, consideration (for its particle size or dimensions, for example) should be taken such that no clogging of these mixed substances occurs with a nozzle (or ejection portion) of an ink jet header. In order to simply avoid such a consideration, the ink material 8 can be used as a dye having high fluidity made of the primary colors.

Figure 8:
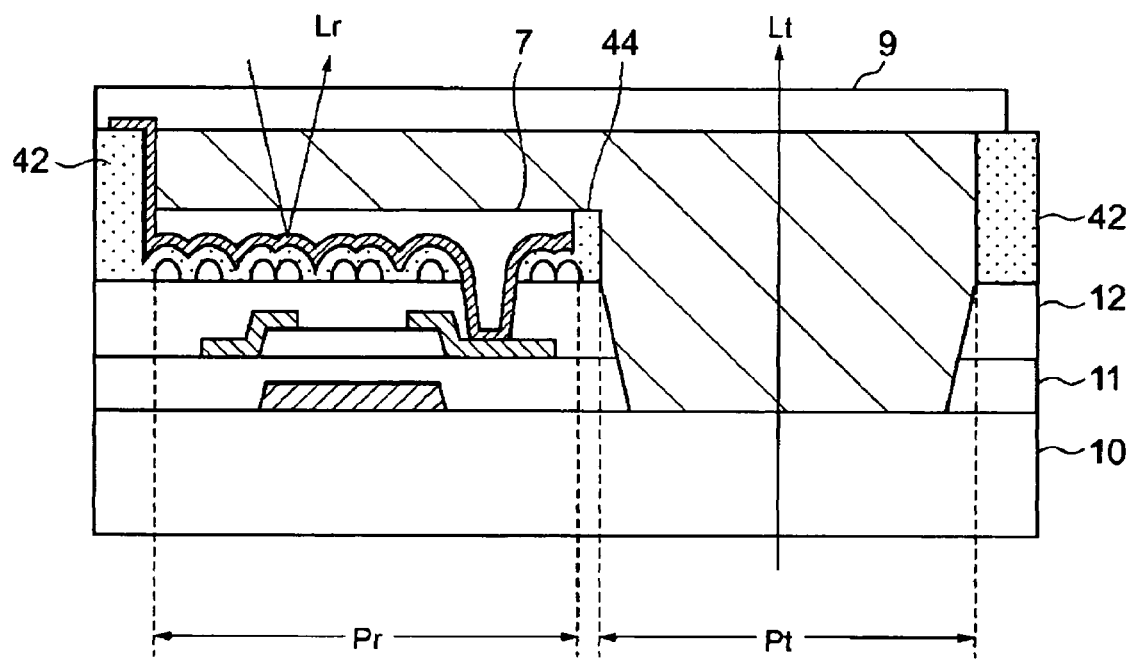
FIG. 8 is a sectional view schematically depicting a color filter structure in an eighth process of a color filter manufacturing method according to the one embodiment of the present invention.

A transparent conductive material such as ITO is deposited on a color layer 8, and then, a transparent conductive film 9 as shown in FIG. 8 is patterned in an individual shape that corresponds to each pixel region. In this manner, the transparent conductive film 9 serves as an electrode for practically applying an electric field to a side opposed to a rear substrate. In addition, this conductive film can be flatly formed all over the pixel region on the color layer in a shape such that the film does not affect a reflection mode. Further, this film can be connected to a light transmission conductive film 9. Furthermore, this film can be connected to the light transmission conductive film 9 via a portion of the lower composite layer (drain electrode 1D in the present embodiment) and the light reflection conductive film 6.

The thus fabricated color filter structure, as shown in FIG. 8, forms a reflection region Pr that handles the second light (reflection light Lr) described previously, the reflection region corresponding to the stepped layer 7; and a transmission region Pt that handles the first light (transmission light Lt) described previously, the transmission region being a region other than the reflection region. In addition, elongated color portions relevant to the primary colors R, G, and B is formed in a shape such that they are sequentially repeatedly arranged, and the vertical direction of a display screen of applicable equipment is used so as to corresponding to the above described y direction.

Now, referring to FIG. 9, a description will be given in more detail with respect to a configuration of an ink jet apparatus and movement control of an ink jet head.

Figure 9:
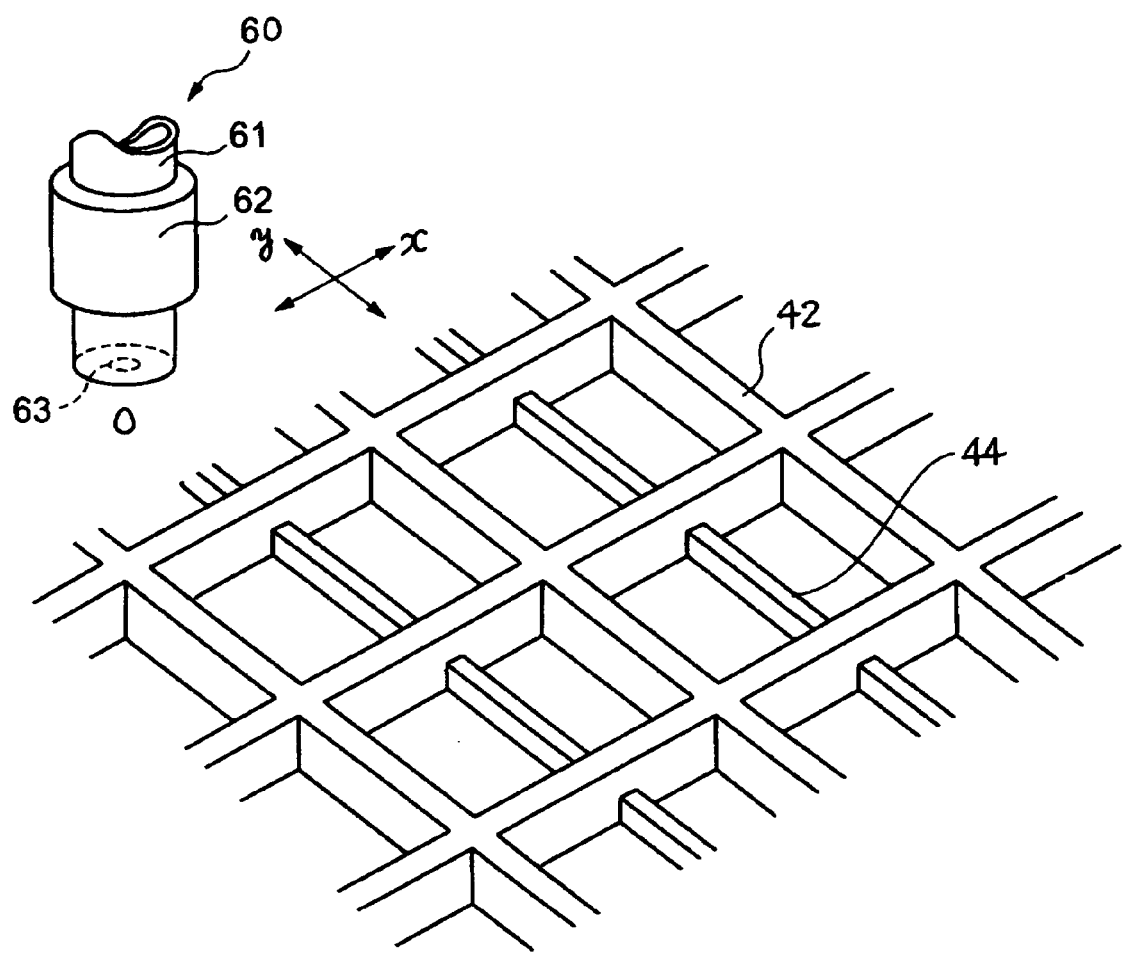
FIG. 9 is a schematic perspective view showing a relationship between a substrate on which a variety of ribs have been formed and an ink jet head.

FIG. 9 depicts a relationship between a rear substrate on which ribs 42 and 44 have been formed and an ink jet head in a substantial perspective drawing technique. In the figure, an ink jet head 60 primarily includes: a cylinder body 61 equipped with a flexible portion and a piezoelectric element 62 provided at that flexible portion. An opening 63 serving as an ejection portion is formed at a distal end of the cylinder body 61 so that an ink liquid from an ink chamber provided in the cylinder body 61 is ejected through this opening 63. An ejection mechanism is basically based on pressurization of the ink chamber using the piezoelectric element 62. Such a mechanism per se is well known, and thus, a detailed description is not given here. In addition, while the present embodiment employs a configuration using a piezoelectric conversion system, a continuous system type configuration can also be employed in addition to other on-demand type configuration such as a thermal conversion system or an electrostatic absorption system. A detailed description of these systems is given in a document "Ink jet printer technique and material", authored by Takeshi AMARI, CMCCo. Ltd., (published on Jul. 31, 1998) and reference should be made thereto.

In the head 60, while its ejection portion 63 is opposed to a dropping target face, and then, is moved to its longitudinal extending direction y with respect to the local column region 424 as described above, dropping of the ink material 7 is carried out. In addition, while the above ejection portion is moved in its longitudinal extending direction y with respect to the comprehensive column region 420 as described above, dropping of the ink material 8 is carried out. An ink jet head to be used may be changed on a basis of the materials to be dropped or a single ink jet head may be used instead of an ink material to be applied.

Figure 10:
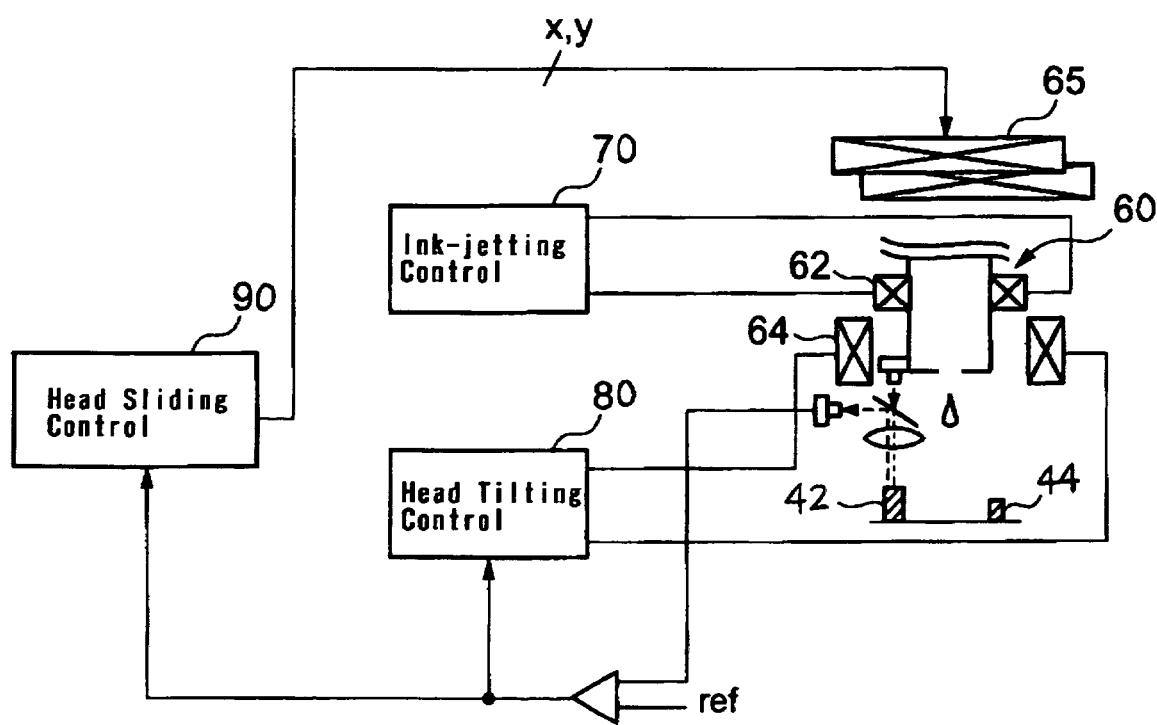
FIG. 10 is a block diagram depicting a schematic configuration for making displacement control of an ink jet head.

FIG. 10 shows a schematic configuration for making displacement control including movement controls in the x and y directions of such a head 60.

In the figure, at the head 60, in addition to the piezoelectric element 62 described previously, there are provided: a transducer 64 for controlling tilting of the head 60; and a slider system 65 for making linear movement in the x and y directions in the substrate main face of the whole head 60. A control signal suitable to the piezoelectric element 62 is generated by means of an ink ejection control circuit 70, and then, the piezoelectric element 62 makes motions such as slacking, expanding/contracting, and twisting motions in response to this control signal and makes a deforming operation of a requested ink chamber. A control signal suitable to the transducer 64 is generated by means of a head tilting control circuit 80, and then, the transducer 64 drives the head 60 so as to change tilting (direction) from a neutral position of the head 60 in response to the control signal. A control signal suitable to the slider system 65 is generated by means of a head slide control circuit 90, and then, the slider system 65 linearly moves the head 60 in the x and y directions in response to the control signal.

The head 60 further has feedback means provided for the purpose of the position and direction control. This head is equipped with: a laser diode additionally provided at the head 60 for the above purpose; a beam splitter for transmitting the emitted laser beam; an objective lens for focusing the transmitted beam toward an ejection target face; and a photodiode for receiving return light obtained through the objective lens and beam splitter from reflection light from the ejection target face. A light receiving output of the photo diode is supplied to one input of a comparator, and a reference signal "ref" is supplied to the other input of the comparator. A beam outputted from the objective lens is irradiated to a rib 42, for example. In the case where the head 60 is set at a proper position in a proper orientation, an amount of light reception in the photo diode, of the return light from the rib 42, is sufficiently small. Otherwise, the light reception amount is increased by light reflection from a surface or the like of the substrate 10. In this way, the return light responsive to the position and orientation of the head 60 is detected by means of the photo diode. In the comparator, this detected output is compared with a value of the reference signal "ref", and an error sense signal indicating a magnitude responsive to the value of the reference signal "ref" is generated. An error sense signal generated when the former is greater than the latter indicates that the head 60 deviates from its proper orientation and position. Then, control is made such that the orientation and position is corrected in the head tilting control circuit 80 and the head slide control circuit 90 in response to or based on the error sense signal. Based on such a configuration, the tilting and position of the head 60 can be corrected so that the head 60 does not deviate from a desired dropping state while the head 60 moves in the x and y directions in the dropping operation.

In the present embodiment, while in dropping operation of the head 60, damming of a dropping liquid is provided by the ribs 42 and 44, and the dropping liquid is prevented from deviating from the dropping region and space. Thus, there is attained an advantageous effect that, even if the alignment precision in the x direction while the head 60 moves in the y direction and/or the alignment precision in the y direction while the head 60 moves in the x direction are low, a stepped layer and a color layer formed in desired shapes can be precisely formed. Therefore, even if a complete configuration as shown in FIG. 10 is not employed by applying feedback to the position and tilting control, it is possible to precisely form the stepped layer and color layer in desired shapes only by voluntary head position control in an ink jet apparatus (as long as that control is proper).

Figure 11:
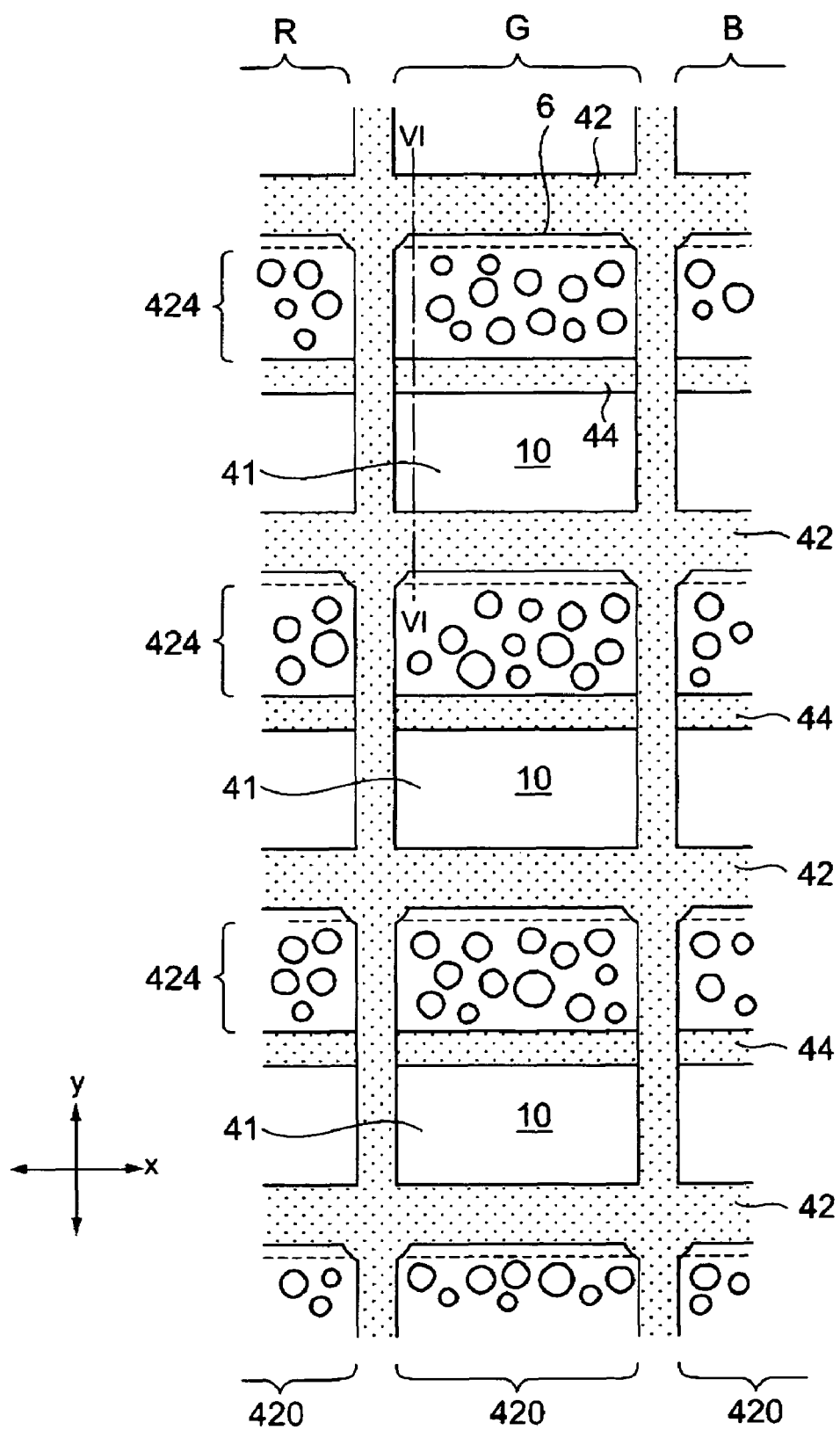
FIG. 11 is a view showing a modified example according to the present invention.

In the present embodiment, a left side substantial half of a pixel region is provided as a reflection region, i.e., as a region of a stepped layer, and a right side substantial half is provided as a transmission region. The movement directions of the head 60 in the dropping operation at the time of forming the stepped layer and the color layer are unified in the y direction, thus simplifying control of the head 60 more significantly and contributing to simplification of the manufacturing steps. However, the region of the stepped layer can be variously modified. For example, this area can be defined as a right side portion of the pixel region or as an upper or lower portion thereof. In order to form the region of the stepped layer at the upper portion, in the case where the rib 44 has been formed to horizontally extend, a rib portion is configured as shown in FIG. 11. The movement direction at the time of dropping on the head 60 in the dropping operation is changed into the x and y directions depending on the stepped layer and the color layer.

In the above-described embodiment, the rib 44 is formed of a material identical to that for the rib 42, thus making it possible to cause the rib 44 to function as a black matrix. That is, at a boundary portion between a pixel reflection region Pt and a transmission region Pr, there is easily produced light which does not belong to a reflection light optical path defined by the reflection region Pr or a transmission light optical path defined by the transmission region Pt. This light can be interrupted by means of the rib 44 so as not to contribute to display. In this manner, the prevention of the lowered contrast of a display image is achieved.

In addition, in the above-described embodiment, a color filter structure is directly incorporated together with a composite layer of a TFT (thin film transistor), thus eliminating alignment required in the case where the color filter is provided on an opposite substrate which is not shown (i.e., front substrate).

While the ribs 44 and 42 are formed utilizing a half-tone mask 5 in the present embodiment, these ribs may be formed utilizing a diffraction mask or the like having a similar function. In addition, while the rib 44 and the rib 42 are formed of the same material in accordance with the same steps by utilizing the half-tone mask 5 in the present embodiment, the rib 44 and the rib 42 may be individually formed by carrying out the steps in accordance with a photolithography technique on a rib-by-rib basis. In such an aspect as well, the stepped layer 7 and the color layer 8 can be easily formed in accordance with an ink jet technique which does not require a photo mask. Moreover, an advantageous effect specific to the present invention is attained in that these ribs are directly incorporated and formed in a TFT composite layer. Further, it is preferable to form a portion serving as a base portion 43 defining a surface shape of a reflection film 6 by using the same material and steps as the ribs 44 and 42 in order to reduce the manufacturing steps. However, it is possible to individually form the ribs or to form them by using the same material and steps as those for one of the ribs.

Second Embodiment

Now, another embodiment of the present invention will be described with reference to FIG. 12 to FIG. 15.

Figure 12:
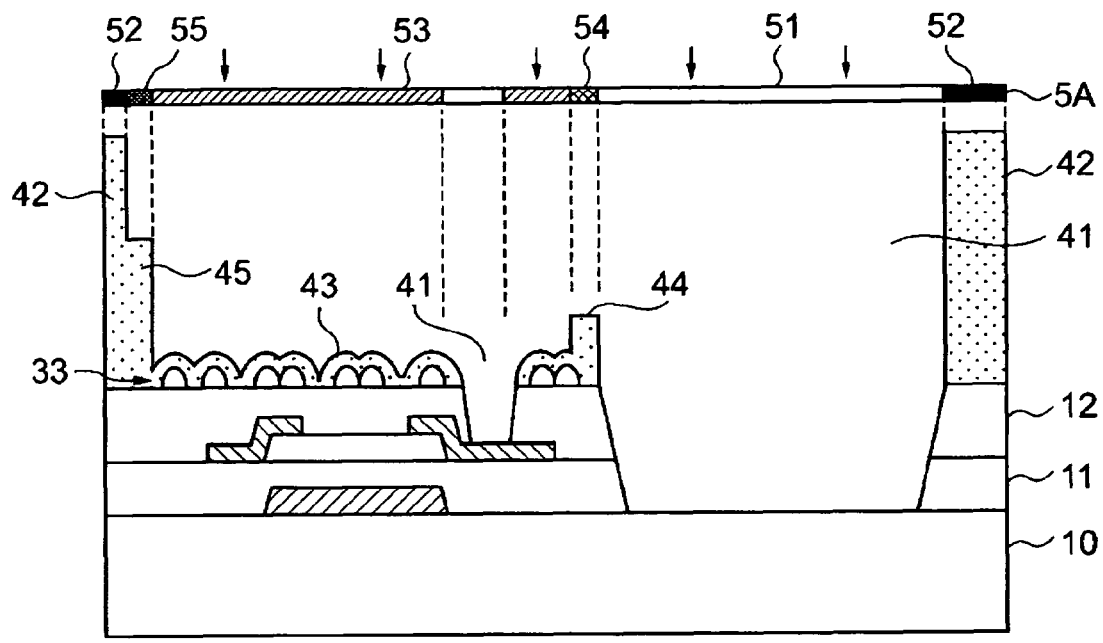
FIG. 12 is a sectional view schematically depicting a color filter structure in one process of a color filter manufacturing method according to the second embodiment of the present invention.

In the present embodiment, masking and exposure treatments as shown in FIG. 12 are carried out after the steps corresponding to FIG. 1 to FIG. 4 in the above described embodiment have been carried out similarly in general. While a mask 5A shown in FIG. 12 is defined as a half-tone mask, this mask is patterned according to five types of portions in this embodiment. A difference from the case of FIG. 5 is that a fifth portion 55 having a transmission rate between a fourth portion 54 and a second portion 52 (about 10% in this embodiment) is provided between a second portion 52 and a third portion 53. The fifth portion 55 is indicated by a white dot on a black base in the figure. In addition, although it cannot be read from FIG. 12, an organic material 4 deposited before masking is defined to be higher than that shown in FIG. 4. This is because a photo spacer described later is formed of this material 4. The organic material 4 is deposited at a height sufficient to form the photo spacer.

After exposure treatment has been carried out using such a photo mask 5A, when developing treatment and fixing treatment are done, there are formed: a portion 41 corresponding to a first portion 51 of the photo mask 5A; a portion 42 corresponding to a second portion 52 thereof; a portion 43 corresponding to a portion 53 thereof; a portion 44 corresponding to a fourth portion 54 thereof; and a portion 45 corresponding to a fifth portion 55 thereof. The portion 41 is provided as a portion from which the organic material 4 has been substantially completely removed, and exhibits a cavity. The portion 42 is hardly irradiated with light, and maintains a non-dissolved state relevant to the developing solution. Thus, this portion substantially remains at a height of the original material 4. The portion 43 is irradiated with light at an intermediate transmission rate that is comparatively high; the portion 44 is irradiated with light at an intermediate transmission rate that is lower than the above; and the portion 45 is irradiated with light at an intermediate transmission rate that is further lower than the above. Thus, between a maximum height of the portion 42 and a minimum height of the portion 41, the height is determined in order of the portions 43, 44, and 45. Thus, as shown in FIG. 12, a variety of portions are formed, each of which is made of the material 4 and has a specific height. Although the portion 43 is identical to that shown in FIG. 5, the portion 42 and the portion 45 each function as a first rib, and the portion 44 functions as a second rib. In addition, the portion 42 in the present embodiment abuts against a surface of an opposite substrate (not shown) at its distal end, thereby making it possible for the above portion to serve as a columnar cross section photo spacer portion that forms a gap relevant to the substrate. The portion 45 serves as a comparative intermediate portion of a height with respect to this spacer portion.

Figure 13:
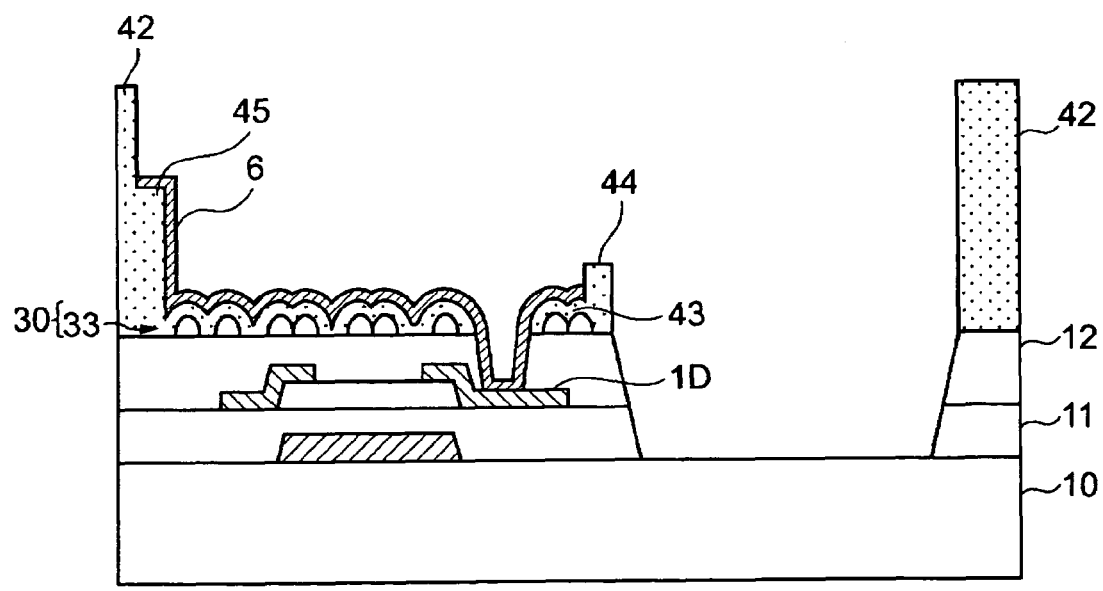
FIG. 13 is a sectional view schematically depicting a color filter structure in a next process of a color filter manufacturing method according to the second embodiment of the present invention.

FIG. 13 shows a structure of a reflection portion formed in the same manner as that shown in FIG. 6, wherein a reflection film 6 extends up to a top face of a fifth portion 45. This reflection film 6 also occupies a reflection region serving as one main region in pixels in the same manner as that for a base layer 33 and a top layer portion 43. A plan view corresponding thereto can be easily conceived from that shown in FIG. 6A. Therefore, this plan view is omitted here.

Figure 14:
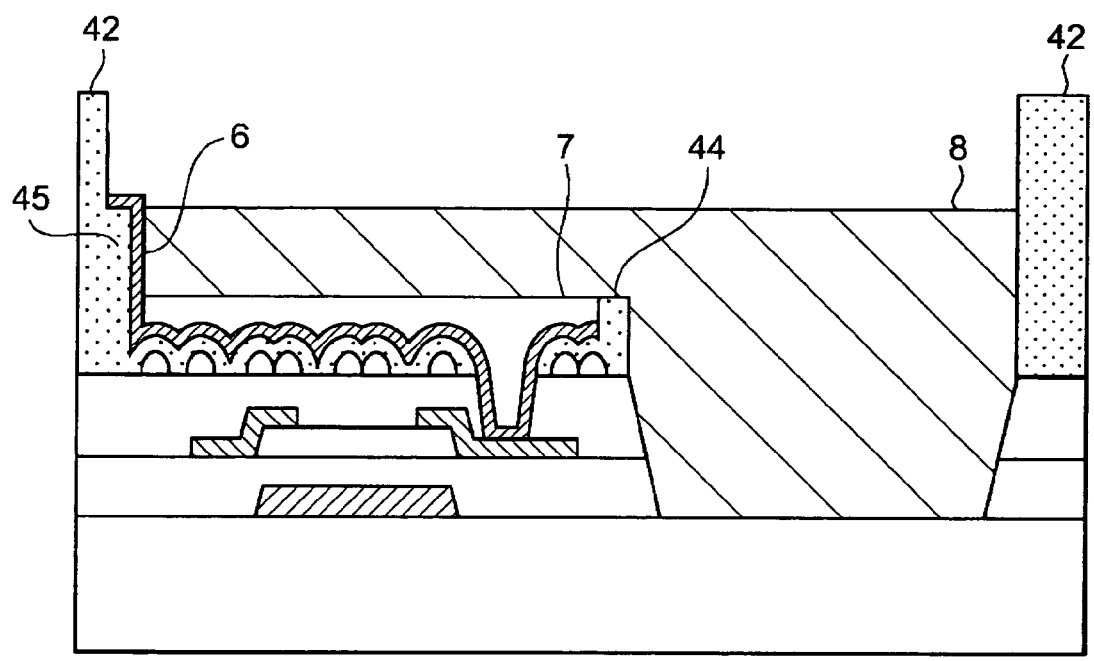
FIG. 14 is a sectional view schematically depicting a color filter structure in a further next process of a color filter manufacturing method according to the second embodiment of the present invention.

After the first and second ribs have been formed, and then, the reflection film 6 has been formed, together with the top layer portion 43 of the base portion 30 of the reflection portion in accordance with treatment using a photo lithography technique, treatment of forming a stepped layer 7 and a color layer 8 in an ink jet technique is carried out as in the first embodiment, as shown in FIG. 14. The color layer 8 is formed with an optimized dropping material and rate or the like thereof so as to have a height that is substantially equal to that of an insulation layer portion 45 serving as a part of the first rib.

Figure 15:
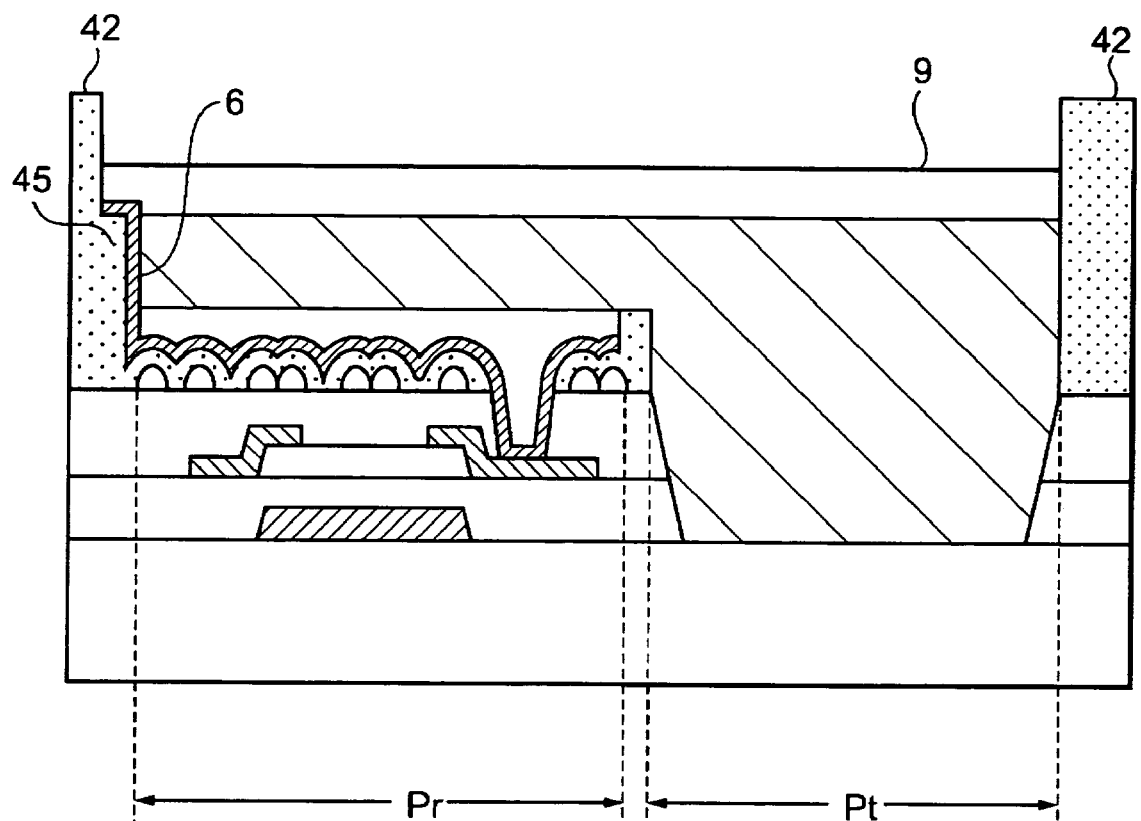
FIG. 15 is a sectional view schematically depicting a color filter structure in a last process of a color filter manufacturing method according to the second embodiment of the present invention.

A transparent conductive material such as ITO is deposited on the color layer 8, and a transparent conductive film 9 as shown in FIG. 15 is patterned in an individual shape that corresponds to each pixel region. However, in the present embodiment, after forming the transparent conductive film 9 as well, a columnar cross section insulation portion 42 still maintains a shape that protrudes from a main face of the color filter structure. A distal end of such protruding portion (photo spacer portion) abuts against a main face of an opposite substrate; a gap between a substrate on which the color filter structure has been formed and the opposite substrate, i.e., a cell gap is formed; and a liquid crystal material is filled in such a gap.

According to the present invention, an advantage identical to that of the first embodiment is attained and a photo spacer can be formed using the same material and steps as those for the rib, thus simplifying the whole manufacturing process.

Third Embodiment

Now, still another embodiment of the present invention will be described with reference to FIG. 16 and FIG. 17.

Figure 16:
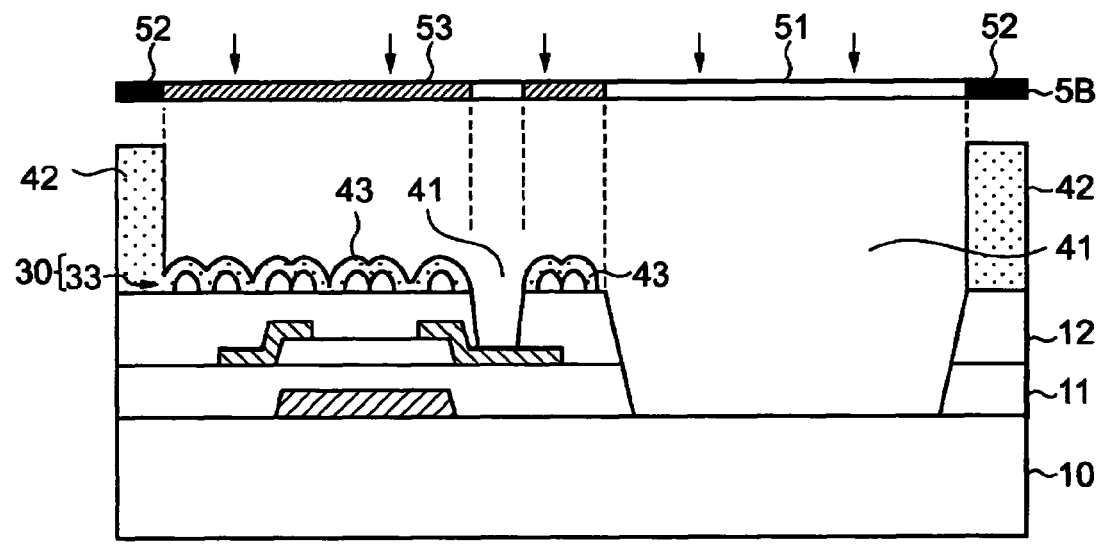
FIG. 16 is a sectional view schematically depicting a color filter structure in one process of a color filter manufacturing method according to a third embodiment of the present invention.

In the present embodiment, after the steps corresponding to FIG. 1 to FIG. 4 in the first embodiment have been carried out similarly in general, masking and exposure treatments as shown in FIG. 16 are carried out. Although a mask 5B shown in FIG. 16 is defined as a half-tone mask, this mask is patterned according to three types of portions in this embodiment. A difference from the case of FIG. 5 is that a fourth portion 54 is not provided and that only first to third portions 51 to 53 are provided.

After exposure treatment has been carried out using such a photo mask 5B, when developing treatment and fixing treatment are done, there are formed: a portion 41 corresponding to a first portion 51 of the photo mask 5B; a portion 42 corresponding to a portion 52 thereof; and a portion 43 corresponding to a portion 53 thereof. The portion 41 is provided as a portion from which an organic material 4 has been substantially completely removed, and exhibits a cavity. The portion 42 is hardly irradiated with light and maintains a non-dissolved state with respect to the developing solution. Thus, this portion remains at a height of a substantially original material 4. The portion 43 is irradiated with light at an intermediate transmission rate, thus providing an intermediate height between the portion 41 and the portion 42. Thus, as shown in FIG. 16, a variety of portions are formed, each of which is made of the material 4 and has a specific height. Although the portion 43 occupies a region of the portion 44 in the case of FIG. 5; the portion 42 functions as a first rib, the second rib as described above is not formed here.

Figure 17:
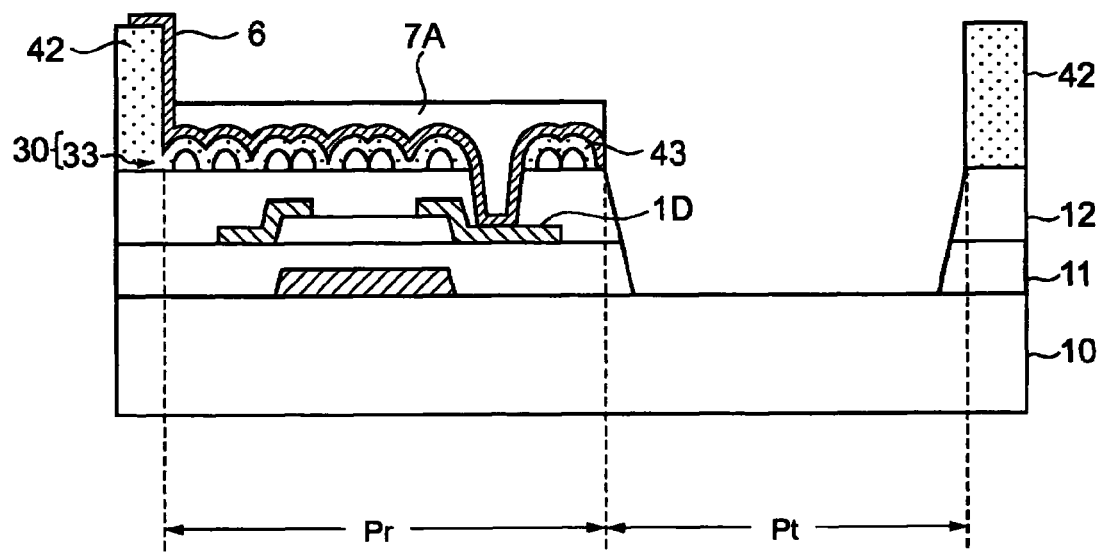
FIG. 17 is a sectional view schematically depicting a color filter structure in a next process of a color filter manufacturing method according to the third embodiment of the present invention.

FIG. 17 shows a structure of a reflection portion formed in the same manner as that shown in FIG. 6. This figure further shows a stepped layer formed on a main face of the reflection portion. A reflection film 6 is deposited on a top layer portion 43 in the same manner as that described previously; is formed so as to extend up to a top face of an insulation portion 42; and occupies a reflection region. A stepped layer 7A is formed on the man face of this reflection film 6 in accordance with a photolithography technique. The stepped layer 7A is defined to have a height equal to that of a second rib 44 as shown in FIG. 5. A plan view corresponding thereto can be easily conceived from that shown in FIG. 6A. Thus, this plan view is omitted here.

Figure 7:
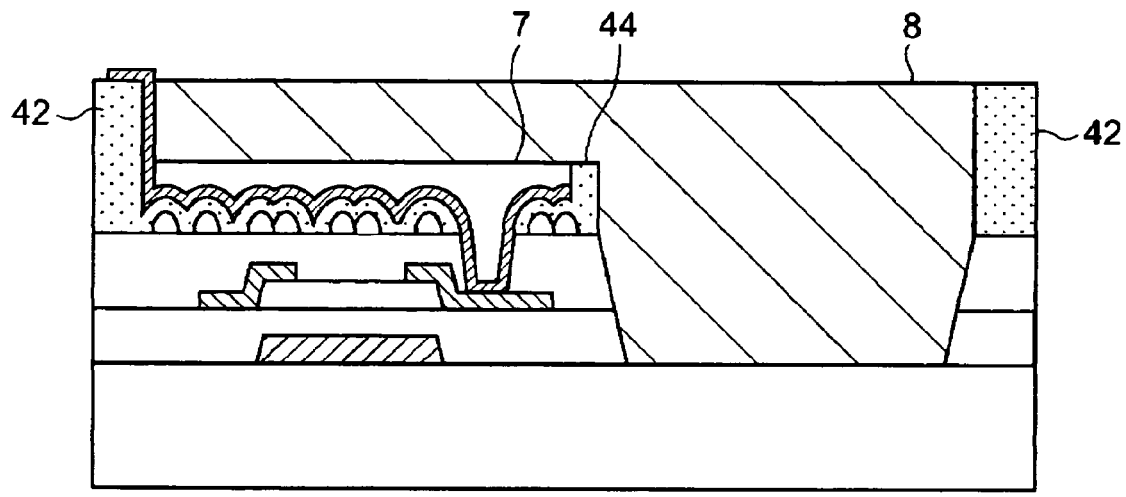
FIG. 7 is a sectional view schematically depicting a color filter structure in a seventh process of a color filter manufacturing method according to the one embodiment of the present invention.

As the reflection film 6 and the stepped layer 7A have been thus formed, treatment of forming a color layer in accordance with an ink jet technique with respect to a region defined by a rib 42 is carried out in the same manner as that shown in FIG. 7 of the first embodiment. Then, transparent conductive materials such as ITO are deposited and patterned on the color layer, and the resulting materials are individually connected to the reflection layer 6.

According to the present embodiment, an advantage identical to that according to the first embodiment is attained in that a color layer can be formed in accordance with an ink jet technique. In addition, a second rib is eliminated, and a stepped layer 7A is formed in accordance with a photolithography technique, whereby a configuration of the mask 5B can be simplified.

Fourth Embodiment

Now, a yet another embodiment of the present invention will be described with reference to FIG. 18 to FIG. 21.

Figure 18:
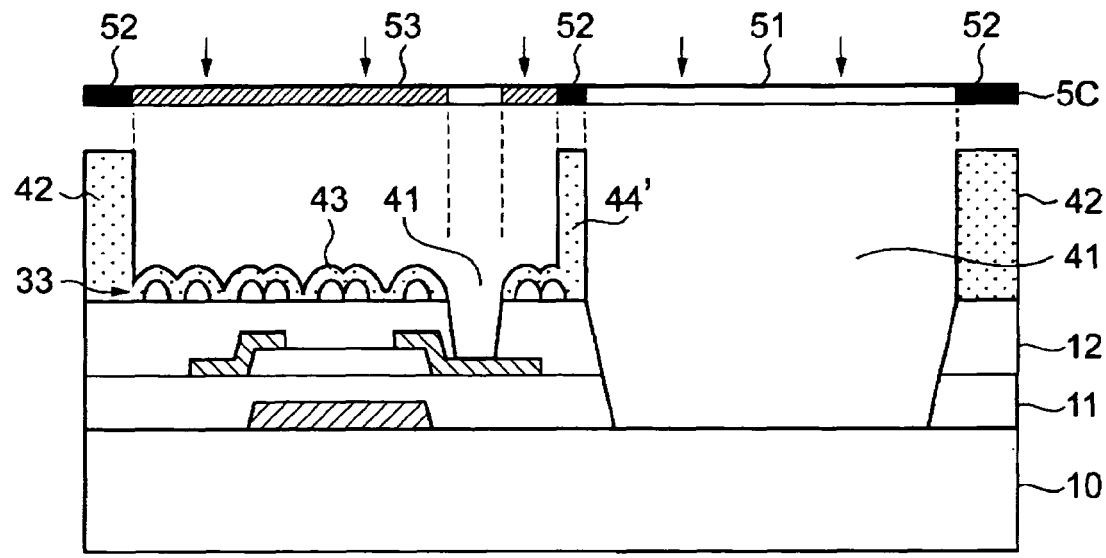
FIG. 18 is a sectional view schematically depicting a color filter structure in one process of a color filter manufacturing method according to a fourth embodiment of the present invention.

In the present embodiment, after the steps corresponding to FIG. 1 to FIG. 4 in the first embodiment have been carried out similarly in general, masking and exposure treatments as shown in FIG. 18 are carried out. Although a mask 5C shown in FIG. 18 are defined as a half-tone mask, this mask is patterned according to three types of portions in this embodiment. A difference from the case of FIG. 5 is that a fourth portion 54 is not provided and that only first to third portions 51-53 are provided. In particular, a mask portion corresponding to a second rib 44 shown in FIG. 5 is defined as a second portion 52 having a substantially complete interruption property.

After exposure treatment has been carried out using such a photo mask 5C, when developing treatment and fixing treatment are done, there are formed: a portion 41 corresponding to a first portion 51 of the photo mask 5C; portions 42, 44' each correspond to a second portion 52 thereof; and a portion 43 corresponding to a third portion 53 thereof. The portion 41 is provided as a portion from which an organic material 4 has been substantially completely removed, and exhibits a cavity. The portions 42, 44' are hardly irradiated with light and maintain a non-dissolved state with respect to the developing solution. Thus, the portions remain at a height of a substantially original material 4. The portion 43 is irradiated with light at an intermediate transmission rate, thus providing an intermediate height between the portion 41 and the portion 42, 44'. Thus, as shown in FIG. 18, a variety of portions are formed, each of which is made of the material 4 and which has a height specific thereto. It should be noted that a second rib 44' serving as a boundary portion between a transmission region and a reflection region is formed at a height equal to that of the first rib 42.

Figure 19:
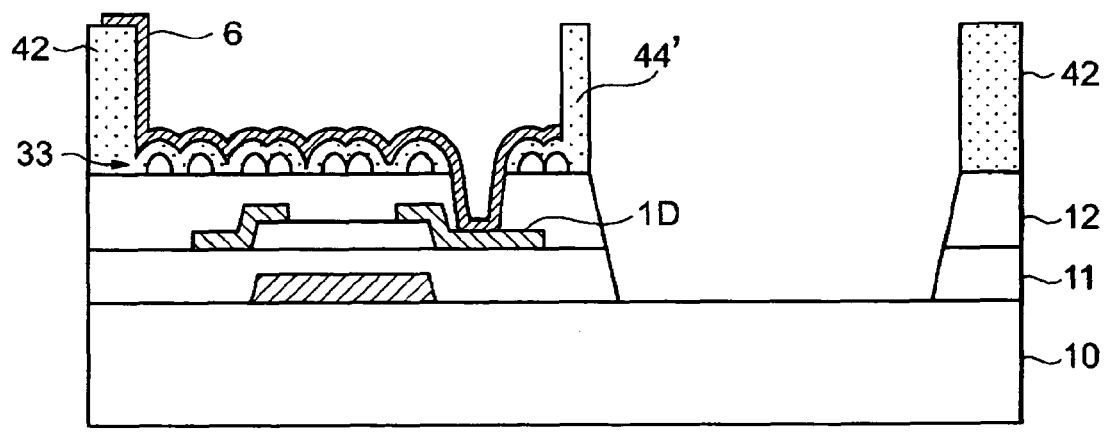
FIG. 19 is a sectional view schematically depicting a color filter structure in a next process of a color filter manufacturing method according to the fourth embodiment of the present invention.
Figure 20:
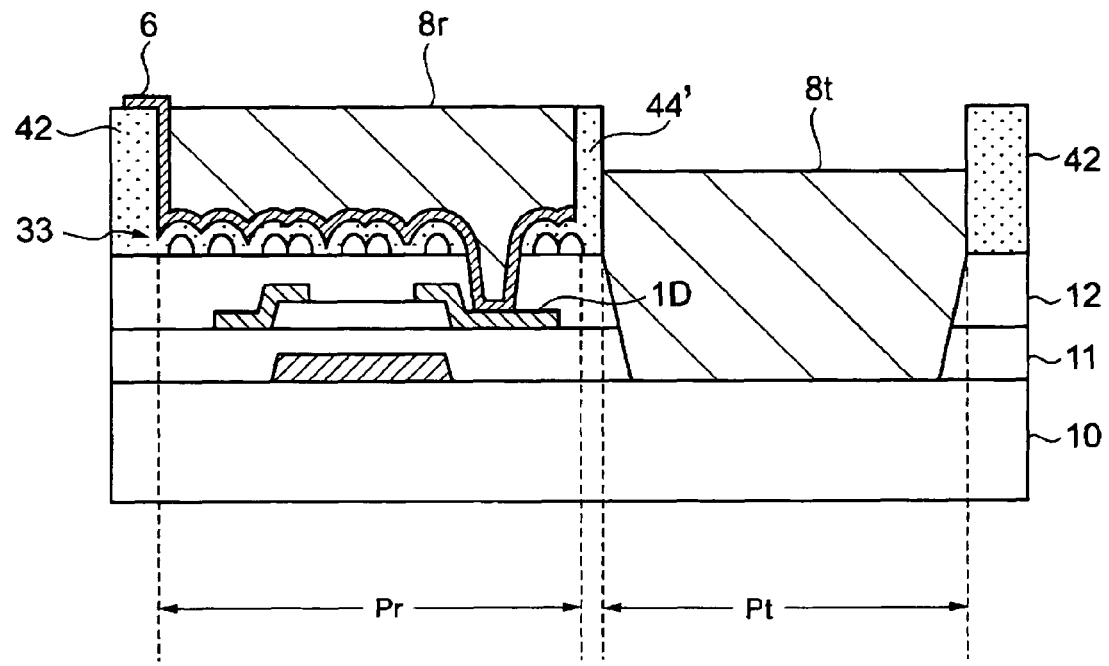
FIG. 20 is a sectional view schematically depicting a color filter structure in a further next process of a color filter manufacturing method according to the fourth embodiment of the present invention.

As shown in FIG. 19, as in FIG. 6, when a reflection film 6 is formed, processing moves to the step of forming a color layer. This appearance is shown in FIG. 20. First, with respect to a reflection region Pr defined by the rib 42 and the rib 44', the dropping of a coloring material is carried out in accordance with an ink jet technique. Then, with respect to a transmission region Pt defined by the rib 42 and the rib 44', the dropping of a coloring material is carried out in accordance with an ink jet technique. This dropping sequence may be reversed. Whichever dropping may be carried out, the same dropping material can be used. The thickness or material and a dropping rate or the like are optimized so that a color portion 8r in the reflection region Pr is smaller in coloring effect than a color portion 8t in a transmission region with respect to incident light of the same optical path.

Figure 21:
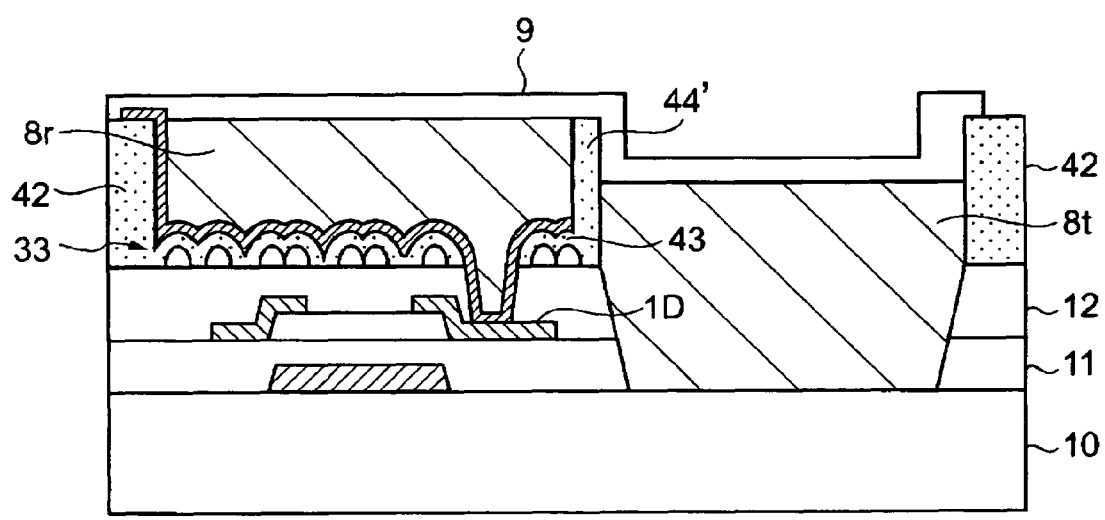
FIG. 21 is a sectional view schematically depicting a color filter structure in a last process of a color filter manufacturing method according to the fourth embodiment of the present invention.

Then, as shown in FIG. 21, a transparent conductive material such as ITO is deposited on the color layers 8r, 8t, and a transparent electrode 9 is formed for each pixel.

Here, as a result, the height of a main face of the color portion 8t in the transmission region Pt is lower than that of a main face of the color portion 8r in the reflection region Pr. This is because a cell gap formed after pasting with an opposite substrate is made different depending on the reflection region and the transmission region, thereby equalizing an optical path length of light handled in a respective one of these regions. That is, a proper cell gap in the reflection region and the transmission region as well as proper thickness (coloring effect) of each of the regions is also formed in accordance with dropping treatment suitable to a respective one of the above described color portions 8r, 8t.

According to the present embodiment, an advantage identical to that according to the first embodiment is attained in a color layer can be formed in accordance with an ink jet technique. In addition, a stepped layer is eliminated, and ink jet parameters including a dropping material and a dropping rate in an ink jet process are changed, thereby making it possible to form proper thickness of each section of the color layer and a difference in cell gap. Therefore, the whole panel manufacturing steps are made efficient.

As is evident from the foregoing description, according to the embodiments of the present invention, the simplification of the whole manufacturing process is achieved by combining the patterning steps in accordance with a photolithography technique and the pattering steps in accordance with an ink jet technique with each other. Moreover, the manufacture of a color filter formed with high precision can be achieved even with the use of a current ink jet technique having low precision for carrying out fine processing (or requiring extremely expensive facilities or the like). Further, a variety of constituent elements in the composite layer can be well unitized in accordance with technical idea of incorporating a color filter structure into a rear substrate side composite layer in which a pixel element is to be formed. Furthermore, the alignment problem described previously is solved, improving convenience.

While the foregoing embodiments have described a color filter for use in a liquid crystal display device, of course, this color filter can be properly applied to a display device capable of using the color filter described here without being limited thereto. In addition, ribs 42, 44, 45, 44' are caused to have light transmission property instead of having light interruption property so as to form an additional black matrix on an opposite substrate, for example, in another layer. In addition, while an example of an R, G, and B stripe-shaped color filter has been shown in the foregoing description, the present invention can be applied to another aspect such as mosaic arrangement without being limited thereto. In addition, of course, a photosensitive resin material used for ribs or the like may be provided by changing a negative type one from a so-called positive type one.

While an example of a TFT serving as a pixel drive element and its peripheral layer has been shown in the foregoing description, the present invention is not always limited thereto.

Further, of course, the concept of simultaneously or integrally forming the rib and the photo spacer as shown in the second embodiment may be added to the configurations shown in the third and fourth embodiments.

While the typical embodiments according to the present invention have been described up to now, the present invention is not limited thereto. A variety of modified examples may be obvious to one skilled in the art without departing from the scope of appended claims.

What is claimed is:

1. A method for manufacturing a color filter structure formed in a display panel that has a front substrate and a rear substrate facing each other, the method comprising:
    a first step of forming a composite layer that includes a pixel drive element in the rear substrate;
    a second step of patterning a first rib along a boundary of a pixel region on or above the composite layer and a second rib arranged in the pixel area in accordance with a photolithography technique, the second rib having a height that is smaller than that of the first rib;
    a third step of dropping a light transmission material in a reflection region defined by the first rib and the second rib and forming a stepped layer in accordance with an ink jet technique; and
    a fourth step of, after the stepped layer has been formed, dropping a light coloring material in a region defined by the first rib and forming a color layer in accordance with an ink jet technique.

2. The method as claimed in claim 1, wherein
    each region defined by the first rib and the second rib in which the light transmission material is dropped is disposed linearly in a main face of the composite layer to form a plurality of line regions, and
    in the third step, an ejection portion of at least one ink jet head is opposed to the line region and is moved along a longitudinal extending direction of the line region, carries out dropping of the light transmission material for each of the line regions.

3. The method as claimed in claim 1, wherein
    each region defined by the rib in which the light coloring material is dropped is disposed linearly in a main face of the composite layer to form a plurality of line regions, and
    in the fourth step, at least one ink jet head, an ejection portion of which is opposed to the line region and is moved along a longitudinal extending direction of the line region, carried out dropping of the light coloring material for each of the line regions.

4. A color filter structure formed in a display panel that has front and rear substrates opposed to each other, the color filter structure comprising:
    a composite layer that includes a pixel drive element formed on the rear substrate;
    a first rib formed along a boundary of a pixel region on or above the composite layer;
    a second rib arranged and formed in the pixel region, the second rib having a height that is smaller than that of the first rib on or above the composite layer;

a stepped layer formed by dropping a light transmission material in a reflection region defined by the first rib and the second rib in accordance with an ink jet technique; and a color layer formed by dropping a light coloring material in a region defined by the first rib in accordance with an ink jet technique.

5. The color filter structure as claimed in claim 4, wherein the first rib serves as a photo spacer for forming a predetermined gap between the front substrate and the rear substrate.

6. The color filter structure as claimed in claim 4, wherein the first rib and the second rib are formed of a light interruption material.

7. The color filter structure as claimed in claim 4, wherein a base portion formed on the composite layer has an irregular surface for exhibiting light scattering property.

8. The display device using a color filter structure as claimed in claim 4, wherein
the reflection region modulates light incident into the display panel from an outside of the front substrate in the reflection region in a reflection mode for each pixel, and a region other than the reflection region in a pixel region modulates light incident into the display panel from an outside of the rear substrate in a transmission mode, thereby forming a color display image.

9. The color filter structure as claimed in claim 4, wherein a reflection portion having a height that is smaller than that of the second rib is formed in the reflection region.

10. The color filter structure as claimed in claim 9, wherein at least a part of a base portion defining a surface shape of the reflection portion is formed simultaneously or integrally with the first rib and/or the second rib.

11. The color filter structure as claimed in claim 9, further comprising a light transmission conductive layer that extends over a surface of the color layer, wherein the reflection portion has a light reflection conductive film that extends over a main face thereof and extends up to a top face of the first rib, and wherein the light reflection conductive film is connected to the light transmission conductive layer in the top face.

12. The color filter structure as claimed in claim 9, further comprising a light transmission conductive layer that extends over a surface of the color layer, wherein the first rib has a photo spacer portion for forming a predetermined gap between the front substrate and the rear substrate and an intermediate portion having a height that is lower than that of the photo spacer portion; wherein the reflection portion has a light reflection conductive film that extends over a main face thereof and extends up to a top face of the first rib; and wherein the light reflection conductive layer is connected to the light transmission conductive layer in the top face.

* * * * *